US012812323B2

(12) United States Patent
Yadegari et al.

(10) Patent No.: US 12,812,323 B2
(45) Date of Patent: Nov. 24, 2026

(54) SPECULAR REFLECTION PATH GENERATION AND NEAR-REFLECTIVE DIFFRACTION IN INTERACTIVE ACOUSTICAL SIMULATIONS

(71) Applicant: The Regents of the University of California, Oakland, CA (US)

(72) Inventors: Shahrokh Yadegari, La Jolla, CA (US); Louis Pisha, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 88 days.

(21) Appl. No.: 19/102,346

(22) PCT Filed: Aug. 22, 2023

(86) PCT No.: PCT/US2023/072658
§ 371 (c)(1),
(2) Date: Feb. 7, 2025

(87) PCT Pub. No.: WO2024/044592
PCT Pub. Date: Feb. 29, 2024

(65) Prior Publication Data
US 2026/0059258 A1 Feb. 26, 2026

Related U.S. Application Data

(60) Provisional application No. 63/373,195, filed on Aug. 22, 2022.

(51) Int. Cl.
*H04S 7/00* (2006.01)

(52) U.S. Cl.
CPC .............. *H04S 7/305* (2013.01); *H04S 7/302* (2013.01); *H04S 2400/11* (2013.01)

(58) Field of Classification Search
None
See application file for complete search history.

(56) References Cited

U.S. PATENT DOCUMENTS 4,677,852 A * 7/1987 Pinyan .................. G01B 17/00 73/644
2015/0294041 A1 10/2015 Yeh et al.
(Continued)

OTHER PUBLICATIONS

Agafonkin, Volodymyr, "Fast icosphere mesh", (2019) [Online]. Available: https://observablehq.com/@mourner/fast-icosphere-mesh, 4 pages.
(Continued)

*Primary Examiner* — Quynh H Nguyen
(74) *Attorney, Agent, or Firm* — Ashurst Perkins Coie US LLP

(57) ABSTRACT

Methods and systems for generating a sound. The method includes obtaining meshes representing at least one object in a frame of an environment, the environment including a source and a receiver; determining spatial continuity information and reflection normal information of the meshes; determining, based on the spatial continuity information and the reflection normal information, reflection paths between the source and the receiver involving the at least one object, each of the reflection paths having at least one reflection point associated with the at least one object; obtaining spatially sampled results by spatially sampling a space around the at least one reflection point of reflection paths using multiple distributions of rays, the spatially sampled results correlating with geometric information of the meshes; generating reflection amplitude responses for each of multiple audible frequencies in the environment based on the spatially sampled results; and producing a sound based on the reflection amplitude responses.

20 Claims, 14 Drawing Sheets

(56) References Cited

U.S. PATENT DOCUMENTS

2016/0037282 A1 2/2016 Giron
2022/0148549 A1 5/2022 Yadegari et al.

OTHER PUBLICATIONS

Allen, John B, "Image method for efficiently simulating small-room acoustics", The Journal of the Acoustical Society of America, (1979), vol. 65, No. 4, pp. 943-950.
Biot, M A, "Formulation of wave propagation in infinite media by normal coordinates with an application to diffraction", 1957, J. Acoust. Soc. Am., vol. 29, No. 3, pp. 381-391.
Blender community, "BMesh design document", (2020) Available: https://wiki.blender.org/wiki/Source/Modeling/BMesh/Design, 14 pages.
Botteldooren, D, "Finite-difference time-domain simulation of low-frequency room acoustic problems", J. Acoust. Soc. Am., vol. 98, No. 6, pp. 3302-3308, 1995.
Calamia, Paul T, "Fast time-domain edgediffraction calculations for interactive acoustic simulations", Eurasip J. Applied Signal Proc., vol. 2007, No. 1, pp. 186-186.
Clevert, Djork-Arné, "Fast and accurate deep network learning by exponential linear units (elus)", arXiv preprint arXiv:1511.07289, 2015, 14 pages.
Embrechts, J J, "Broad spectrum diffusion model for room acoustics ray-tracing algorithms", The Journal of the Acoustical Society of America, vol. 107, No. 4, pp. 2068-2081, 2000.
Epic Games, "Unreal Engine", (2020) [Online]. Available: https:/www.unrealengine.com/en-US, 11 pages.
Evangelou, I, "Fast radius search exploiting ray-tracing frameworks", Journal of Computer Graphics Techniques Vol, vol. 10, No. 1, 2021, 24 pages.
Gouraud, Henri, "Continuous shading of curved surfaces", IEEE Trans. Comput., vol. 100, No. 6, pp. 623-629, 1971.
Hamilton, Brian, "Room acoustics modelling using gpu-accelerated finite difference and finite vol. methods on a face-centered cubic grid", Proc. Digital Audio Effects (DAFx), Maynooth, Ireland, pp. 336-343, 2013.
Ioffe, Sergey, "Batch normalization: Accelerating deep network training by reducing internal covariate shift", International Conference on Machine Learning, PMLR, 2015, pp. 448-456.
ISA, International Search Report and Written Opinion for International Application No. PCT/US2023/072658, mailed on Feb. 1, 2024, 19 pages.
Kharya, P, "TensorFloat-32 in the AIO0 GPU accelerates AI training, HPC up to 20X", (2020, May) [Online]. Available: https://blogs.nvidia.com/blog/2020/05/14/tensorfloat-32-precision-format/, 15 pages.
Kouyoumjian, Robert G, "A uniform geometrical theory of diffraction for an edge in a perfectly conducting surface", Proceedings of the IEEE, vol. 62, No. 11, pp. 1448-1461, 1974.
Lakulish, Antani, "Interactive sound propagation using compact acoustic transfer operators", ACM Transactions on Graphics (TOG), vol. 31, No. 1, pp. 1-12, 2012.
McDowell, S, "PyTorch C++ APL", (2019) PyTorch C++ APL [Online]. Available: https://pvtorch.org/cppdocs/, 7 pages.
Morrical, Nate et al., "Efficient space skipping and adaptive sampling of unstructured vols. using hardware accelerated ray tracing", in 2019 IEEE Visualization Conference (VIS). IEEE, 2019, pp. 256-260.
Morrical, Nate, "Accelerating unstructured mesh point location with RT cores", IEEE Transactions on Visualization and Computer Graphics, 2020, 15 pages.
Morrical, Nate, "Inverse transform sampling using ray tracing hardware", in Ray Tracing Gems II. Springer, 2021, pp. 625-641.
Morton, G M, "A computer oriented geodetic data base and a new technique in file sequencing", International Business Machines Co. Ltd., Ontario, Canada, 1966, 20 pages.
Murphy, Damian, "Acoustic modeling using the digital waveguide mesh", IEEE Signal Processing Magazine, vol. 24, No. 2, pp. 55-66, 2007.
NVIDIA Corporation, "CUDA zone", (2022) [Online]. Available: https://developer.nvidia.com/cuda-zone, 7 pages.
NVIDIA Corporation, "NVIDIA OptiX 7.4 programming guide: Acceleration structures", (2022) Available: https:/raytracing-docs.nvidia.com/optix7/guide/index.html#/accelerationstructures, 1 page.
NVIDIA Corporation, "NVIDIA Turing GPU architecture", (2018) Available: https://images.nvidia.com/aem-dam/enzz/Solutions/design-visualization/technologies/turingarchitecture/NVIDIA-Turing-Architecture-Whitepaper.pdf, 86 pages.
NVIDIA, "NVIDIA OptiX ray tracing engine", [Online]. Available: https://developer.nvidia.com/rtx/ray-tracing/optix, 6 pages, Feb. 7, 2025.
NVIDIA, "NVIDIA RTX platform", (2022) [Online]. Available: https://developer.nvidia.com/rtx, 14 pages.
Pisha, Louis, "Approximate diffraction modeling for real-time sound propagation simulation", J. Acoust. Soc. Am., vol. 148, No. 4, pp. 1922-1933, 2020.
Saarelma, Jukka, "Challenges of distributed real-time finite-difference time-domain room acoustic simulation for auralization", in Audio Engineering Society Conference: 2018 AES International Conference on Spatial Reproduction—Aesthetics and Science, Jul. 2018. [Online]. Available: http://www.aes.org/elib/browse.cfm?elib=19609, 11 pages.
Schissler, Carl, "Fast diffraction pathfinding for dynamic sound propagation", ACM Transactions on Graphics (TOG), vol. 40, No. 4, pp. 1-13, 2021.
Schissler, Carl, "High-order diffraction and diffuse reflections for interactive sound propagation in large environments", ACM Transactions on Graphics (TOG), vol. 33, No. 4, p. 39, 2014.
Schubert, Stefan, "Circular convolutional neural networks for panoramic images and laser data", in 2019 IEEE Intelligent Vehicles Symposium (IV). IEEE, 2019, pp. 653-660.
Summers, Jason E, "Inaccuracy in the treatment of multiple-order diffraction by secondary-edge-source methods", J. Acoust. Soc. Am., vol. 133, No. 6, pp. 3673-3676, 2013.
Svensson, U Peter, "An analytic secondary source model of edge diffraction impulse responses", J. Acoust. Soc. Am., vol. 106, No. 5, pp. 2331-2344, 1999.
Tropf, H, "Multidimensional range search in dynamically balanced trees", Angewandte Info., No. 2, pp. 71-77, 1981.
Unity, "The world's leading platform for real-time content creation", (2022) [Online]. Available: https://unity.com/, 11 pages.
Wald, I, "Owl: a node graph "wrapper" library for OptiX 7", (2022) [Online]. Available: https://github.com/owl-project/owl, 18 pages.
Wald, Ingo, "The elephant on RTX—first light, or: ray tracing Disney's Moana Island using RTX, OptiX, and OWL", (2020) [Online]. Available: https://ingowald.blog/2020/10/26/moanaon-rtx-first-light/, 13 pages.
Yadegari, Shahrokh, "Inner room extension of a general model for spatial processing of sounds", in Proc. International Computer Music Conference, Barcelona, Spain, Sep. 2005, pp. 1-4.
Zellmann, Stefan, "Accelerating force-directed graph drawing with RT cores", in 2020 IEEE Visualization Conference (VIS). IEEE, 2020, pp. 96-100.

* cited by examiner

SPECULAR REFLECTION PATH GENERATION AND NEAR-REFLECTIVE DIFFRACTION IN INTERACTIVE ACOUSTICAL SIMULATIONS

CROSS-REFERENCE TO RELATED APPLICATION(S)

This patent document is a U.S.C. § 371 National Stage application of International Application No. PCT/US2023/072658 entitled "SPECULAR REFLECTION PATH GENERATION AND NEAR-REFLECTIVE DIFFRACTION IN INTERACTIVE ACOUSTICAL SIMULATIONS" and filed on Aug. 22, 2023, which claims priority to and benefits of U.S. Provisional Patent Application No. 63/373,195 entitled "SPECULAR REFLECTION PATH GENERATION AND NEAR-REFLECTIVE DIFFRACTION IN INTERACTIVE ACOUSTICAL SIMULATIONS" filed on Aug. 22, 2022. The entire content of each of the aforementioned patent applications is incorporated by reference as part of the disclosure of this patent document.

TECHNICAL FIELD

This patent document relates to acoustics and, particularly, to methods and systems for acoustical simulation.

BACKGROUND

Systems for simulating sound propagation in a virtual environment for interactive applications may use ray- or path-based models of sound. With these models the "early" (low-order) specular reflection paths play a significant role in defining the "sound" of the environment.

SUMMARY

Disclosed are methods, systems, devices, that among other features and benefits provide for producing, substantially in real time, a sound in an acoustical scene including a source, a receiver, and at least one (sound reflecting) object.

Some aspects of the present disclosure relate to a method for generating a sound. In some embodiments, the method includes: obtaining meshes that represent at least one object in a frame of an environment, the environment including a source and a receiver; determining spatial continuity information and reflection normal information of the meshes; determining, based on the spatial continuity information and the reflection normal information, a plurality of reflection paths between the source and the receiver involving the at least one object, each of the plurality of reflection paths having at least one reflection point associated with the at least one object; for each of the plurality of reflection paths, obtaining a spatially sampled result by spatially sampling a space around the at least one reflection point using multiple distributions of rays, the spatially sampled results correlating with geometric information of the meshes; and generating reflection amplitude responses for each of a plurality of audible frequencies in the environment based on the spatially sampled results. In some embodiments, the method further includes producing a sound based on the reflection amplitude responses.

Some aspects of the present disclosure relate to a non-transitory computer readable program storage medium having code stored thereon, the code, when executed by a processor, causing the processor to implement methods for producing a sound as described herein.

Some aspects of the present disclosure relate to a system, including at least one processor and memory including computer program code which, when executed by the at least one processor, causes the system to effectuate the methods as described herein.

Some aspects of the present disclosure relate to a system, including at least one processor and memory including computer program code which, when executed by the at least one processor, causes the system to effectuate the methods as described herein.

DETAILED DESCRIPTION

Systems for simulating sound propagation in a virtual environment for interactive applications may use ray- or path-based models of sound. With these models, the "early" (low-order) specular reflection paths play a significant role in defining the "sound" of the environment. However, the wave nature of sound, and the fact that smooth objects are approximated by meshes (e.g., triangle meshes), may pose challenges for creating realistic approximations of the reflection results. Existing methods which produce accurate results are too slow to be used in most interactive applications. This document presents a method for reflections modeling called spatially sampled near-reflective diffraction (SSNRD), based on an approximate diffraction model, Volumetric Diffraction and Transmission (VDaT). The SSNRD model may address the challenges mentioned above, produce results accurate to within 1-2 dB on average compared to edge diffraction, and may be fast enough to generate thousands of paths in a few milliseconds in large scenes. In some embodiments, this method encompasses scene geometry processing, path trajectory generation, spatial sampling for diffraction modeling, and a small deep neural network (DNN) to produce the final response of each path. Some or all steps of the method may be graphics processing unit (GPU)-accelerated. Merely by way of example, NVIDIA RTX real-time ray tracing hardware may be used for spatial computing tasks beyond just traditional ray tracing.

Figure 1:
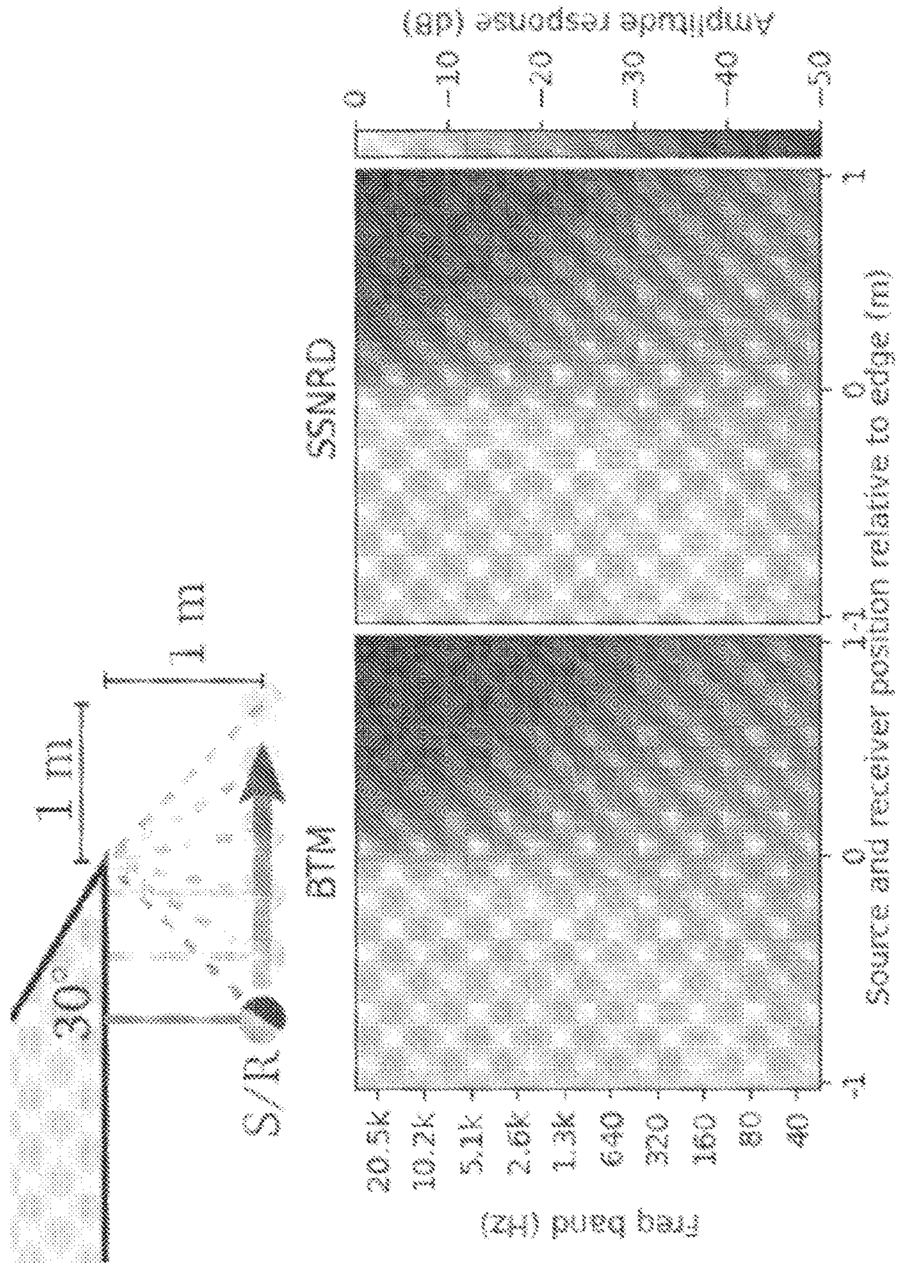
FIG. 1 shows changing amplitude response of a reflection path as a reflection point moves past an edge of an object according to some embodiments of the present document.

In path-based interactive sound simulations, when sound sources, receivers, and scene objects move, the paths need to be recomputed and move correspondingly. In simple implementations, when a reflection point in a specular reflection path moves off the edge of an object, the specular reflection path ceases to exist. Conversely, when the objects move in the opposite direction, the path may abruptly come into existence. These situations can cause discontinuities (audible clicks) in the simulated audio, which could be an artefact of modeling sound waves by rays. In reality, not only does the "reflection path" smoothly fade, it also has frequency-dependent behavior: high frequencies fade in or out more abruptly near the edge, while low frequencies are affected over a wide range of distances both before and after the edge (FIG. 1). Modeling this behavior—and avoiding the clicks—is a first challenge of realistically simulating specular reflection paths.

FIG. 1 shows changing amplitude response of a reflection path as the reflection point moves past the edge of the object according to some embodiments of the present document. The sound source ("S") and receiver ("R") are colocated and move as shown in the upper diagram. SSNRD (right), the method described in this document, closely matches the results of the BTM edge-diffraction model (left).

A second challenge may also result from the wave nature of sound, but manifests differently. A simple specular path implementation may have the path response dependent on the material of the reflecting object, but not the size of that object. For example, the reflection off a marble and off a large wall of glass may supposedly sound the same, which is not realistic; the marble should reflect much less sound, especially at low frequencies. Simply "baking" the size information into the object's acoustical properties is not a general solution to this problem, as the reflection response is influenced by nearby geometry as well. For example, a wall made of a large number of small bricks which happen to be placed next to each other should have a specular reflection which sounds similar to that of a large wall made of the same brick material, even though the specular reflection path involves only one small brick. Somehow, the single specular reflection path here may need to incorporate information about at least some (e.g., all) of the nearby bricks, even though their relative positions may not be known until runtime.

A third challenge considered here may result from the fact that in most interactive applications (VR, games, etc.), objects are modeled as meshes of triangles (or quadrilaterals, which can easily be considered pairs of triangles). When a smooth object is approximated by a triangle mesh, the specular reflections are no longer smooth around the object, and do not even exist for angles between the normals of adjacent triangles. As used herein, the term "triangle" is used interchangeably with "mesh," unless otherwise noted. This problem was solved in computer graphics with Gouraud shading—the interpolation of normals between the vertices of each triangle. However, applying this technique to specular path generation for acoustics has some subtleties which are discussed below.

A wavefield simulation of the acoustical space may be spared from the first two challenges (as it does not approximate sound by rays or paths), and the third challenge can be overcome simply by increasing the mesh detail until any remaining error is substantially below the shortest wavelength of interest. However, despite recent advances, wavefield simulations are still far too computationally intensive to be possible in interactive applications with non-trivial, continuously changing scenes.

Figure 2:
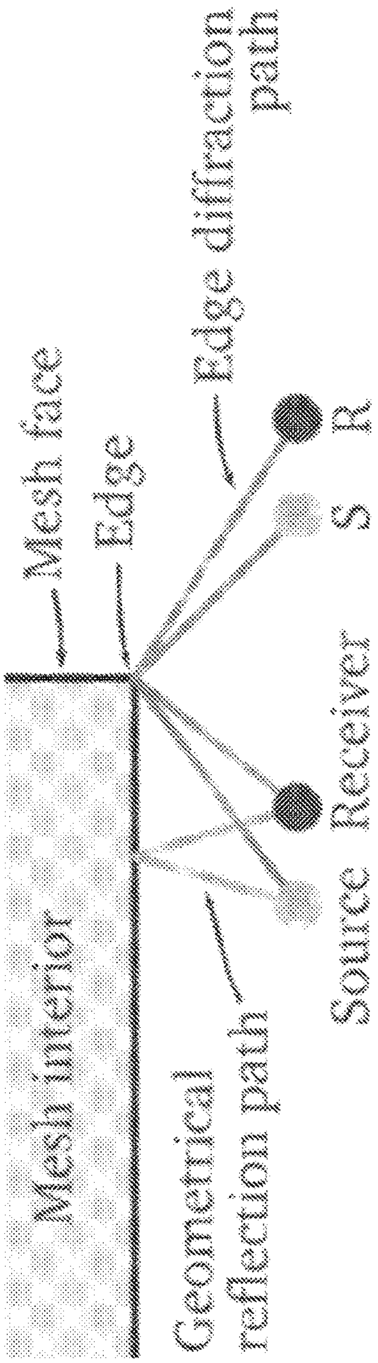
FIG. 2 shows in an edge-diffraction model such as BTM, the left source-receiver pair has a geometrical reflection path and a diffraction path off the edge, and the right pair only has a diffraction path according to some embodiments of the present document.

Another approach is the Biot-Tolstoy-Medwin (BTM) edge diffraction model. BTM defines an edge diffraction path to exist regardless of the angles; for example, even when the source and receiver are on the same side of an occluding object (FIG. 2). FIG. 2 shows in an edge-diffraction model such as BTM, the left source-receiver pair has a geometrical reflection path and a diffraction path off the edge, and the right pair only has a diffraction path according to some embodiments of the present document. These are both examples of "near-reflective diffraction."

Edge diffraction paths in this configuration can be referred to as near-reflective diffraction, in contrast to shadowed or near-shadowed diffraction where a direct path is occluded or almost occluded. The sum of the near-reflective diffraction path and the geometrical acoustics reflection path (when it exists) gives the overall reflection response, including the proper fade and frequency-dependent behavior near the edge. BTM has been analytically shown to match the wave equation solution for a single finite wedge, and is conjectured to also approach the correct solution (as the diffraction order is raised) for arbitrary convex geometry. In some cases, the accuracy of BTM on non-convex geometry may be low. However, BTM needs a large amount of computation, for two reasons. First, it requires a numerical integration over the edge, which is nested for each edge in higher-order diffraction (e.g., a double integral for second-order, etc.), making computing higher-order results very resource-intensive. Second, finding the set of edge diffraction paths is a challenge: brute force may mean checking about $\eta^{o}$ candidate paths per source-receiver pair where n is the number of edges in the scene and o is the diffraction order. Some models use a set of algorithms for finding edge diffraction paths interactively in large scenes, using a combination of mesh preprocessing, path caching, and a clever corner finding algorithm. Nevertheless, such models are only usable interactively when combined with the Uniform Theory of Diffraction (UTD) edge diffraction model, a much simpler model which assumes all edges are of infinite length and thus is not suitable for detailed meshes.

Still another potential approach is to trace a large number of diffuse paths with Monte Carlo, applying a frequency-dependent bidirectional reflectance distribution function (BRDF) at each bounce and not giving specular reflection paths any special role outside of the BRDF. The BRDF for high frequencies may be spatially narrow, causing reflection paths to be close to specular and therefore change rapidly at an edge, while low-frequency paths may reflect at almost any angle and be less dependent on edge position. Generating diffuse paths by Monte Carlo has been widely discussed, but it is not clear that this technique has been used in order to address the challenges with specular paths and diffraction described above, and some implementations do not appear to be frequency-dependent at all. This approach may involve difficulties for at least two reasons. First, it is not clear a priori whether enough Monte Carlo samples may be made in real time to achieve sufficient accuracy without any perceptible artefacts from constantly varying sets of paths. Dealing with this sort of noise in the output is a well-known challenge in Monte Carlo ray tracing for computer graphics. Path caching is a viable option when the scene does not change quickly, but having the quality drop when things move quickly or when sound sources are first spawned is not ideal. Second, the path generation method in this document is designed for the Space3D real-time acoustic modeling and audio spatialization system. This system needs that paths exist and are synchronized across multiple frames so that the changing delay times of the paths can be used to produce spatial impressions. This also permits simulation of the Doppler effect. In contrast, Monte Carlo diffuse path generation produces independent room impulse responses every frame; there is no way to connect a given path in one frame to "the same" path in the next frame so that its delay can be continuously changed.

This document introduces a method, called spatially sampled near-reflective diffraction (SSNRD), which includes both specular path generation (determining the path trajectories) and specular path response modeling (computing the frequency response of a given reflection point of a given specular reflection path). First, scene geometry is subject to minimal preprocessing (Section 2) to extract connectivity and normal information. Second, a set of path trajectories which is stable and consistent across frames is generated (Section 3), through a process involving real-time ray tracing steps, iterative refinement, and high-dimensional radius search. Next, the space around each reflection point of each path is sampled with rays (Section 4) to characterize the topology of the nearby reflecting objects (also referred to as objects for brevity). Finally, the spatial sampling results are processed by a small deep neural network (DNN) (Section 5) to produce the frequency response of each reflection. Merely for illustration purposes and not intended to be limiting, all processing illustrated herein is GPU-accelerated with NVIDIA CUDA and RTX (via OptiX), and the RT core (real-time ray tracing hardware present in NVIDIA RTX GPUs) is used to accelerate tasks beyond traditional ray tracing; performance results are shown in Section 6.

Briefly, according to some embodiments, the overall strategies employed by SSNRD to solve the challenges described above and other challenges include:

- Reflection normals are modelled to smoothly transition around convex edges of meshes, even if those edges represent real, sharp edges in the object being modeled. This enables "specular" reflection paths to be found even when no specular paths (in the geometric acoustics sense) exist.
- Candidate reflection paths are traced from audio receivers, reflecting off objects according to the normals above, until they hit large virtual objects around audio sources. Then, these paths are iteratively refined to actually hit the point source.
- Path candidates are merged into discrete specular reflection paths, and synchronized to the corresponding paths which existed in the previous frame.
- To sample the space around each reflection point, rays are traced "into" the reflecting object in a pattern of concentric cylinders. The distance each of these rays travels before hitting the reflecting object (or any nearby meshes) provides information about those meshes' local size, shape, and the distance from any edges.
- The DNN converts this information into a reflection amplitude response.

2 Mesh Preprocessinq

The method described in this document, SSNRD, may be applied as a path generation system for Space3D, a real-time acoustic modeling and audio spatialization system for interactive applications such as virtual reality (VR) and games. Space3D is designed to be used in game engines as an audio plugin, so it is essential to be able to quickly handle typical dynamic scene data from these applications. Furthermore, the game engine may arbitrarily deform objects, such as for skeletal animation, and submit the updated vertex positions to Space3D. In these cases, any preprocessing which is dependent on vertex positions may be repeated every frame, which excludes many types of processing-intensive mesh simplification techniques. Fortunately, mesh simplification is not needed, as NVIDIA RTX real-time ray tracing is fast even in very large scenes, and all the algorithms in the present method which interact with unknown parts of meshes do so via RTX. After the game engine provides the mesh vertices, indices, and material information, two sets of data are calculated about each mesh for the use of the SSNRD path generation: mesh connectivity (Section 2.1) and specialized vertex normals (Section 2.2).

2.1 Connectivity

Connectivity is an integer, for each edge of each triangle, stating which triangle it is connected to, or −1 if it is not connected to any triangle. Triangles are assumed to be single-sided; mesh topologies where more than two triangles share an edge, or an edge of one triangle is coincident with only part of an edge or the face of another triangle, are not properly supported and may be considered not connected. More descriptions regarding the meshes applicable in the connectivity may be found elsewhere in the present disclosure. See, e.g., Section 3.1.

Connectivity information is internally used by some 3D editor programs, but is not present in most mesh file formats or either Unreal Engine 4 or Unity. Therefore, it may be extracted from the mesh when instantiated. Normally, connectivity only depends on the mesh indices (an array stating which number vertices compose each triangle). However, in many applications, information about whether edges are "smooth" or "sharp" is encoded using "split vertices." In this scheme, when an edge represents part of a smooth surface, the triangles on each side of the edge share the vertices of that edge, but when an edge represents a real, sharp edge in the model, the vertices of that edge are duplicated so that the two triangles do not share vertices. SSNRD may treat both of these cases as connected triangles, meaning that the connectivity algorithm may take into account vertex positions in order to detect split vertices.

To avoid checking whether every edge of a mesh is shared with another triangle (by indices and by vertex positions) by brute force, a method is developed which uses the RT core to compute the mesh connectivity. See, e.g., Section 3.3 for more background on similar topics. A small pattern of three rays (FIG. 3) is traced around every edge of every triangle. Because triangles are one-sided, these rays are drawn in directions such that they are not hit the current triangle, but may hit any triangle connected to it with the normals pointed in the appropriate direction. Triangles hit with this method are checked to make sure they share two vertex positions with the current triangle. The "radius" of this pattern of rays may be upper bounded by the minimum size of any detail in the mesh, and lower bounded by floating point precision considerations; the default radius is about 1 mm.

In some embodiments, finding which triangles are connected to which other triangles may be performed on a per-object basis. Accordingly, two adjacent triangles from a same object may be considered connected; two triangles from different objects which happened to be next to each other may be considered not connected. In some embodiments, finding connected triangles may be applied to meshes constructed by combining all adjacent objects into one; in such cases, those triangles may be considered connected regardless of whether they represent a same object or different objects that are adjacent to each other.

Figure 3:
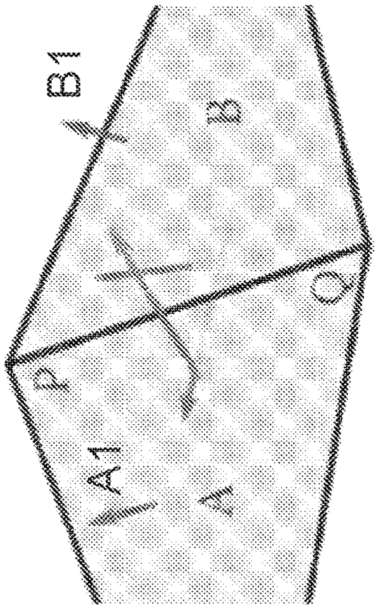
FIG. 3 shows a process for determining mesh continuity according to some embodiments of the present document.

FIG. 3 shows a process for determining mesh continuity according to some embodiments of the present document. As illustrated, to identify which triangle, if any, is connected to triangle A along edge PQ, a triangular pattern of three rays (illustrated in FIG. 3 as a triangle formed by three rays with an arrow at the end of each ray) around the center of that edge is traced as shown here. Rays are directional and the mesh triangles are set as one-sided (arrows A1 and B1, respectively), so at least one of these three rays may intersect triangle B, and none of them intersects triangle A. The three rays slightly overlap at the ends (exaggerated as illustrated) to avoid or reduce the risk of missing a triangle due to floating-point precision issues.

This approach leverages the same acceleration structures which are used by the later ray tracing, making the overhead of the algorithm low. Traversal by one ray of a triangle mesh in a bounding volume hierarchy (BVH) is typically O(log t), but due to the efficiency of the RT core and the extremely small length of the rays, the time taken for launching and processing results from rays is almost always longer than the actual acceleration structure traversal. Thus, this algorithm appears (Sec. 6) to run in O(1) time per ray (or O(t) time for the whole mesh) in practice, which is extremely desirable for mesh preprocessing.

2.2 Reflection Normals

Vertex normals are widely used in computer graphics, and simply represent a unit normal vector to the mesh at each vertex. These normals can be interpolated at any point on a triangle to produce smooth (Gouraud) shading. SSNRD precomputes the vertex normals of each mesh, but the normal at each vertex is stored per-triangle, as the normal at a given vertex may be different for each triangle sharing the same vertex. This is because, in SSNRD, concave edges are treated like disconnected edges (Section 2.2.1). To compute the vertex normal for a particular triangle, the triangles sharing that vertex are iterated around in both directions until the iteration arrives at a concave or disconnected edge (or returns to the original triangle). The resulting convex group of triangles all contribute to a vertex normal according to their area and angle. If there are concave or disconnected edges, the tangent at these edges also contributes to the vertex normal.

2.2.1 Concave Edges

Disconnected edges of a mesh are treated as if their normals are pointing outward, tangent to the triangle. (The final reflection normals used are not this extreme, see Section 2.2.2.) This is so that reflection paths can be found pointing outwards near the edge, which is needed so that reflection paths do not sharply appear or disappear at the edge. Concave edges are treated the same way (FIG. 4*a*). This is because on a surface with smooth, concave normals, specular reflection paths are not unique (FIG. 4*b*), and therefore candidate paths cannot be refined into unique specular paths to be synchronized to "the same" paths in the next frame. With this method, there may only be one specular reflection path per convex portion of the mesh (e.g., per triangle), separated by concave edges. This produces expected results in concave spaces such as rooms, and also allows obtuse corners in these spaces to have smooth edge behavior (FIG. 4*c*). Furthermore, as the triangles of a concave mesh get smaller, more specular paths may be found, but each one may have a frequency response reduced in magnitude at lower frequencies, as the triangles may appear to be smaller independent reflectors to the spatial sampling algorithm (FIG. 4*d*). This avoids the total reflection energy growing as the mesh gets more detailed.

Figure 4:
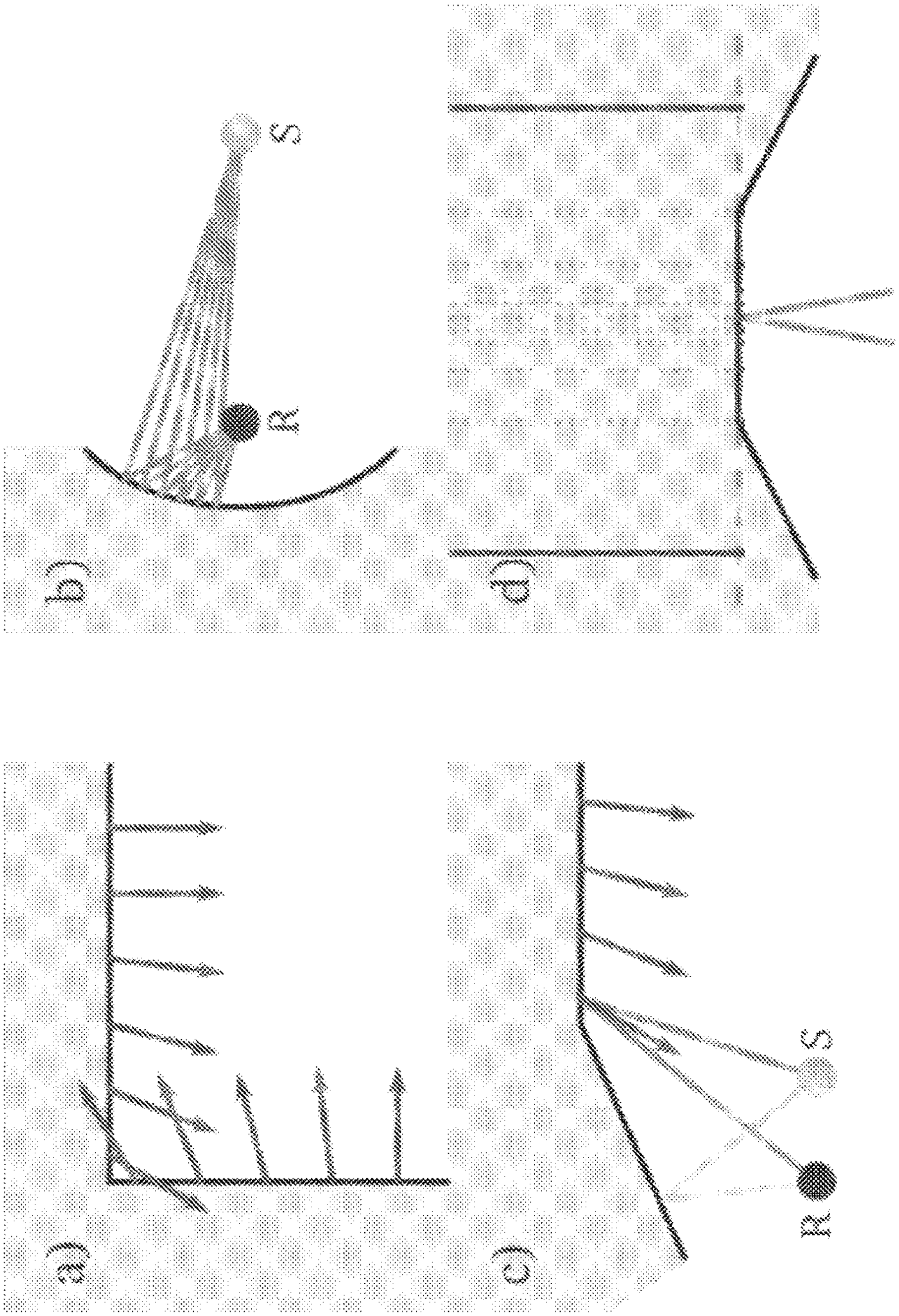
FIG. 4 shows examples of edge normals according to some embodiments of the present document.

FIG. 4 shows examples of edge normals according to some embodiments of the present document. In FIG. 4, (a) shows an edge-on view of normals at a concave edge; (b) shows a continuous range of specular reflection paths may exist off a smooth, concave surface; (c) shows a reflection path is generated off the top face in this configuration because the normals curve outwards at the concave edge. If the normals were perpendicular to the face, this reflection path may disappear at the edge; (d) shows a spatial sampling (Section 4) for one face of a concave surface only "sees" that face, not the neighboring ones.

2.2.2 Computing Final Reflection Normals

When a ray intersects a triangle of a mesh, the normal is computed at that point. Three values for the reflection normal are computed, one per edge, and then these three vectors are interpolated according to the reflection position's relative distances to each of the edges. Each edge normal starts by being rotationally interpolated between the vertex normals at the ends of the edge, based on how close the reflection point is to each end of the edge. Next, the edge's reflection normal is adjusted so that if the intersection had occurred at the edge, the outgoing reflected ray may continue in or above the plane of the triangle, rather than clip into the triangle (FIG. 5*a*). Finally, the edge's reflection normal is interpolated towards the triangle's face normal based on the relative distance to the reflection point compared to the distance to the edge. This is so that when the receiver is close to the mesh, the mesh appears to be less curved locally, but still remains curved near the edge (FIG. 5*b*). This method evaluates the edge normal the same way for both triangles which share a convex edge, and therefore it guarantees that the normals interpolate smoothly around that edge (FIG. 6).

Figure 5:
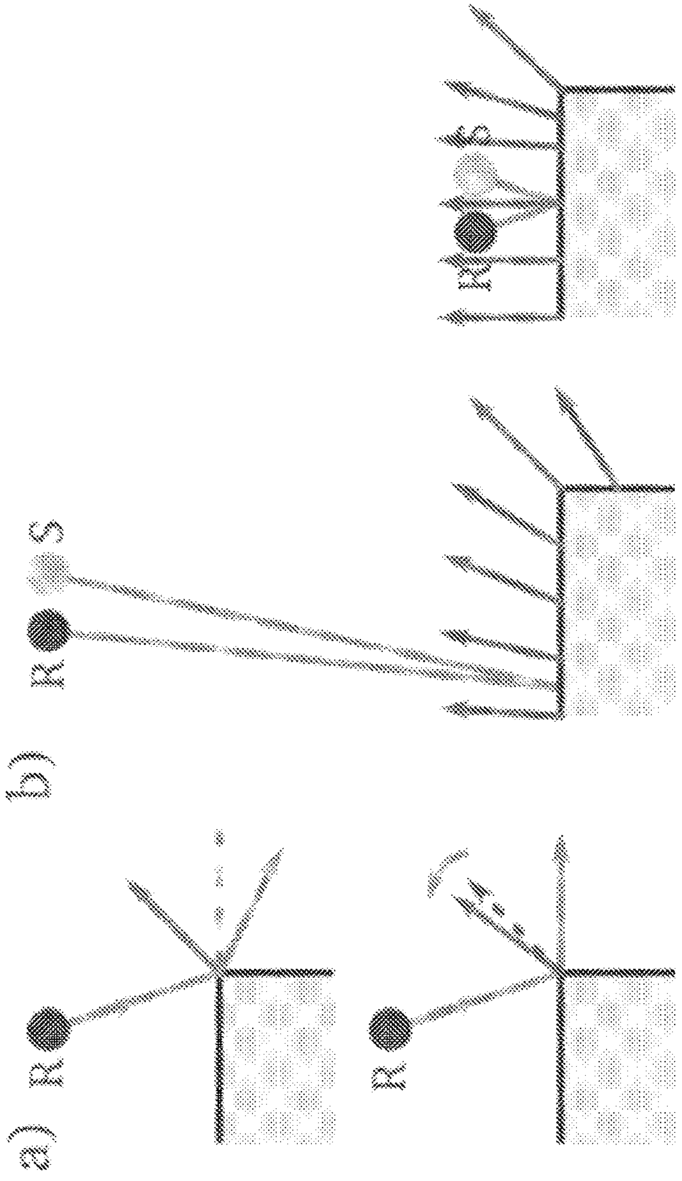
FIG. 5 shows examples edge normals according to some embodiments of the present document.

FIG. 5 shows examples edge normals according to some embodiments of the present document. In FIG. 5, (a) shows the edge normal is adjusted—made more perpendicular—so that a reflection path cannot continue into the plane of the triangle; (b) shows the "curvature" of the normals around an edge is locally reduced as the receiver approaches the triangle.

Figure 6:
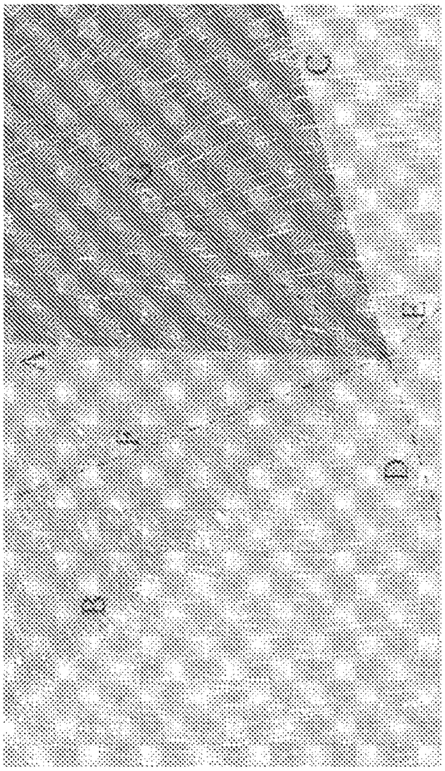
FIG. 6 shows visualization of normals computed at various points on the surface of a mesh according to some embodiments of the present document.

FIG. 6 shows visualization of normals computed at various points on the surface of a mesh according to some embodiments of the present document. Note that the normals smoothly curve around the convex edge A, angle slightly outwards from each face at the concave edges B-C, and are continuous at the flat edges D-G, even though all these edges share the same vertex.

3 Path Generation

Generating specular reflection paths may seem to be a trivial process: trace some rays from a sound receiver (e.g., microphone), reflect them off scene geometry, and see if they hit the sound source(s). The propagation of sound can be simulated from source to receiver or receiver to source with theoretically identical results. However, in applications with fewer receivers than sources, such as most VR and games applications, each ray traced from a receiver is more likely to provide useful information about the scene acoustics than each ray traced from an arbitrary source. Yet path generation is far from simple in SSNRD; at a high level, this is mainly for three reasons. First, in order for specular paths not to appear or disappear at edges of objects as described in Section 1, these paths may be generated even "past" the edges of objects. Second, also as described elsewhere in the present document (see, e.g., Section 1), the spatialization algorithm in Space3D needs that paths exist over multiple consecutive frames, with their parameters possibly changing. So for example, if the scene does not change, the same set of specular paths may be found this frame as in the previous frame; and if the scene changes slightly, some of the paths may move or change slightly but still be identifiable as the corresponding paths in the previous frame. Finally, as many specular paths as possible need to be found within the tight real-time constraints, including paths reflecting near the receiver and paths far from it.

In some embodiments, the method includes at least four main steps of path generation including: ray tracing (Section 3.1), refining candidate paths (Section 3.2), merging candidate paths with others nearby (Section 3.4), and synchronizing each path with the corresponding path in the previous frame (Section 3.5). Path merging and path synchronization both utilize a radius search algorithm (Section 3.3).

3.1 Ray Tracing

First, the scene data structures required by the RT core are built or updated. NVIDIA OptiX 7 accessed via OWL provides the interface to the RT core and data structure setup. Meshes have BVH acceleration structures built, and are instantiated with their transformation matrices (as determined by the game engine or other program hosting Space3D). There are two top-level scenes created: one containing just meshes for all the auxiliary ray tracing steps, and one containing both meshes and sources (described below) for the main path generation ray tracing, in which the sources may be represented as new meshes (e.g., nested boxes exemplified by axis-aligned bounding boxes), as described later. Also, a temporary top-level scene is created for each individual mesh when computing its connectivity (Section 2.1).

Figure 7:
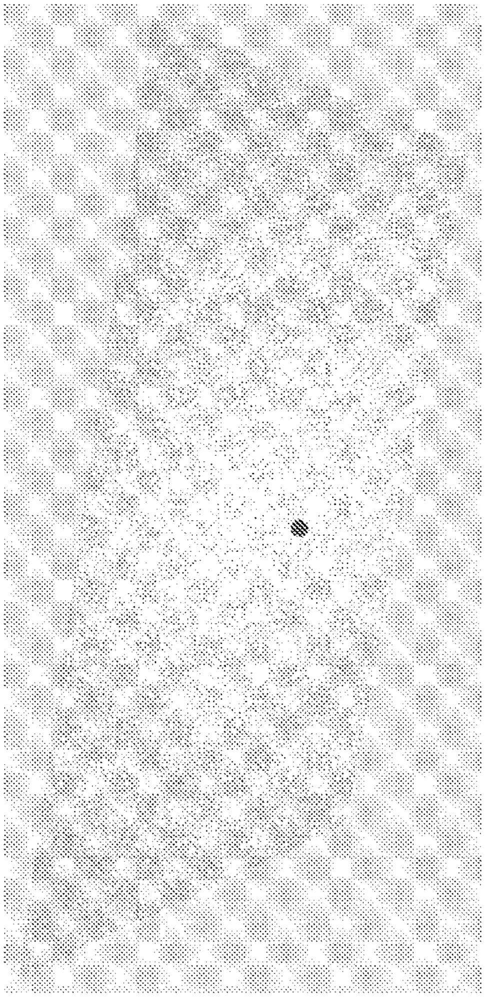
FIG. 7 shows intersection points on a mesh according to some embodiments of the present document.

Next, ray distribution sampling is performed. The goal of this step is to make the irradiance (density of rays per surface area) on scene geometry, by rays from the receivers during the main path generation ray tracing step below, roughly uniform (FIG. 7). FIG. 7 shows intersection points on a mesh according to some embodiments of the present document. a white dot is drawn everywhere a ray intersects the mesh. The density of these rays on the mesh per surface area is roughly uniform, despite some parts of the mesh being much farther from the receiver (blue) than others. The visible pattern of nonuniformities in this density are due to the spherical pattern of ray distribution bins around the receiver.

For example, if a receiver is close to one wall in a room, and the rays from the receiver were distributed uniformly, many more rays may reflect off the nearby wall than the far wall, and so reflection paths involving the near wall may be much more likely to be found. In contrast, if the irradiance on all walls is roughly uniform, reflection paths anywhere in the room may have a more even chance of being found. To accomplish this, rays are traced from the receivers according to a uniform spherical distribution, and the average distance to a mesh intersection is computed in each of a plurality of bins (e.g., 384 bins) of roughly equal angular surface area of a sphere. Then, the inverse of the irradiance over these bins is used as the distribution of rays from that source for the ray tracing in the main path generation below. Accordingly, the distances are measured with a uniform spherical distribution, and the distribution of these distances so determined is used to bias the ray distribution (the pseudorandom distribution) used in the main path generation. This step is computationally cheap and helps avoid missed paths in areas farther from the receiver as well as wasted computation on duplicated paths near the receiver. The RT core may also be used for adaptive spatial sampling in other applications.

Finally, the main path generation ray tracing is performed. Rays are emitted from receivers, according to a pseudorandom distribution which is seeded the same way every frame so that rays are always traced in the same set of directions. Merely by way of example, a pseudorandom number generator is used to generate the directions for each of multiple frames; the generator is seeded with the same values for each frame so that the generator generates the same set of directions for every frame. These directions are still consistent if the number of rays per bin changes due to the ray distribution sampling; these changes add or remove rays but do not affect the other ray trajectories. Rays may intersect meshes or sources; in either case the OptiX anyhit (AH) program for that type of geometry is run. For example, in frame 1 in a particular bin, the generator generates 5 rays of 5 directions including directions a, b, c, d, e; in frame 2 in the same bin, instead of 5 rays, the generator generates 6 rays of 6 directions including directions a, b, c, d, e, and f; directions a through e are the same in both frames.

Each ray emitted from the receiver is actually a "bundle" of $n_B$ (e.g., 8 or 16) rays which are initially identical. When these rays intersect a mesh, half of them according to their index continue through (are transmitted), and the other half reflect according to the local mesh normal (Section 2.2). If the bundle only contains one ray, because several reflections or transmissions have already occurred, the ray continues to do whatever it did more often in its history: a ray which has mostly reflected before may continue to reflect, and a ray which has mostly transmitted before may continue to transmit. Even if the meshes are not intended to have significant acoustical transmission, these transmission rays are essential for the VDaT diffraction algorithm. This algorithm approximates diffraction around obstacles by spatially sampling the scene around an existing transmission path through the obstacle, and then applying appropriate filtering to the path.

Sources are represented by OptiX "custom primitives," which are effectively axis-aligned bounding boxes (AABBs) which the RT core reports ray intersections with. Up to six of these boxes with different sizes are instantiated at each source, one per reflection order, and ray visibility masks are used to ensure that only rays of the appropriate order intersect each sized source box. For example, rays emitted directly from a receiver are "zeroth order" rays, and never intersect sources (direct paths are handled separately); rays having reflected from a mesh once are "first order" rays and only intersect the smallest, first order boxes around sources; and so on. When a ray intersects one of these boxes, its distance to the point source is computed, and the intersection is discarded if the ray is not close enough. This source radius is computed on a per-ray basis as $$r = \frac{1}{2}\sqrt{n_T/\rho},\ \rho = n_R/(4\pi d^2),$$

where $n_T$ is a target number of rays to hit each source, $n_R$ is the total number of rays traced from the receiver, d is the total distance (including reflections) along the ray, and ρ is the effective ray density at this distance. The size of the source boxes is determined based on this equation and parameters for estimated maximum path lengths of each order $\hat{d}_{max}(o)$; the goal is to keep them as small as possible so that most of the culling can be done by the RT core, rather than hitting the source box and then being discarded. When a ray intersects the source box and successfully passes this distance check, the path including this ray is saved to memory as a candidate path, and the ray continues through the source.

3.2 Path Refinement

The path refinement step converts candidate paths from the ray tracing, which approach a source within a certain minimum distance described above, to paths which directly hit the point source. If all reflections were off planes whose normals were all parallel, the exact reflection points needed to hit the source could be computed via the image source method. However, since reflecting objects are usually "curved" based on their normals (and not curved according to a simple analytical function), direct computation is infeasible and an iterative method is used.

A ray from the receiver (e.g., a ray segment between the receiver and a reflection point) is perturbed slightly in two perpendicular angular directions (e.g., in azimuth direction and in altitude direction, or another pair of two perpendicular angular directions). A slight perturbation is lower bounded by floating point precision considerations. Merely byway of example, the value of the perturbation is 0.001 meters in each of the two directions. In each of these new directions, a path is traced, intersecting the same triangles at slightly different positions (with slightly different normals), and eventually approaching the source again. The direction this "source intersection" point moved from each of the perturbations, relative to the direction it needed to move in order to hit the source, is computed to generate a value for each of the new directions. These values are converted to multipliers (e.g., 1, 2, 3, 4, 5, etc.) on the original two perturbations, and the path is traced again in the direction which may hit the source according to this first-order approximation. For this third path trace, if a reflection point moves outside a triangle, and that triangle is connected to another one over a convex edge, the reflection point is moved to the new triangle. If it is not connected or concave, the path is discarded. Then, a new perturbation is computed and the process is repeated a small number of times; if the resulting position does not converge to within a distance 5 within this number of steps, the path is discarded. 5 is set to half the path merging distance (see below) for the current order, ensuring that paths which do converge may be properly merged.

3.3 Radius Search

Both the path merging Section 3.4 and path synchronization Section 3.5 steps below involve performing a radius search: for each point in set A, find all points in set B which are within a certain distance according to a certain norm. In path merging, sets A and B are the same, and the goal is to find clusters of nearby points. In path synchronization, A and B are paths in the previous and current frame respectively, and the goal is to find the nearest path to each, by checking the distance to all nearby points and choosing the minimum. In both of these cases, the operation may be done independently for every combination of source, receiver, and path order. Thus the data being compared is the coordinates of all of the reflection points on the path, which can be viewed as a single point in 3o-dimensional space where o is the reflection order. Three algorithms are implemented to perform these radius searches.

First, a brute force comparison of all pairs of inputs is implemented. This is the least efficient theoretically, but has almost no overhead, unlike the other approaches. Furthermore, this can be parallelized over both A and B, whereas both of the approaches below are only parallelized over A and each thread does $O(\log(|B|))$ operations. If $|A| \ll N_t$ where $N_t$ is the number of threads the GPU can execute in parallel, the approaches only parallelized over A are unlikely to be efficient.

Second, a traditional radius search based on Morton numbers is implemented. A Morton number is a single large integer, here up to 96 bits, which encodes the coordinates of a point in two or more dimensions by interleaving the bits of each coordinate. First, a bounding box containing all the paths is computed. Next, each path is assigned its own Morton number, and these numbers are sorted. Finally, the radius search is performed, which searches the list and returns all points within a specified $\ell_\infty$ norm ball (hypercube) of the queried location. If the $\ell_2$ norm is desired, all of the returned points are checked again based on their $\ell_2$ distance. Due to the structure of the Morton numbers, this search may be performed in $O(\log(|B|))$ time per search point in A. However, the overhead is large because multiple GPU kernels are run to set up the data (though each one is $O(|B|)$ or $O(|B|\log(|B|))$). Also, the search itself involves a large number of bit manipulation operations, which the GPU has lower throughput for compared to floating-point operations.

Finally, the RT core may be leveraged to implement a faster radius search. Since the Turing GPU architecture introduced RT cores in 2018, the RT core's ability to traverse a BVH very efficiently in hardware has been applied to several types of problems outside traditional ray tracing. The algorithm discussed here is an extension of the radius search done by others to higher-dimensional data. In the basic radius search, points B are converted into bounding boxes in a scene, centered at their point locations and with a radius equal to the search radius. Extremely short rays at each query point A are traced, and the RT core returns all boxes from B which are within the radius according to the $\ell_\infty$ norm. Like with the Morton numbers approach above, the actual paths are then checked for $\ell_2$ distance.

The RT core only handles 3D data, but as discussed above the points here may be of dimension 3, 6, 9, etc. Furthermore, independent searches may be done for paths of each order, source, and receiver, but it is not desirable to set up and ray trace independent scenes for each of these combinations, as this may lead to them all being processed serially. Instead, for each path p, the order o(p), source index s(p), receiver index r(p), and all reflection points $x_i(p)$ are encoded into a single 3D point v:

$$v(p) = v_o o(p) + v_r r(p) + v_s s(p) + \sum_{i=1}^{o} M_i x_i(p) \tag{1}$$

$v_o$, $v_s$, $v_r$, and $M_i$ are arbitrary, constant values used for all paths. $v_o$, $v_s$, and $v_r$ are large vectors used to move the paths for each order, source, and receiver spatially away from each other. Their magnitude may be larger than the typical expected scene size but not so large that the floating-point precision is significantly reduced when farther from the origin. $M_i$ are orthonormal (rotation) matrices, and one of them (e.g., $M_1$) can be the identity matrix. Their role is to break symmetries which may exist in the scene geometry, and are more likely to exist along the coordinate axes than at random rotations. They may be orthonormal to avoid changing the scale of the paths relative to the radius being searched. The search radius ρ(o) for each order is slightly increased:

$$\rho'(o) = \sqrt{o}\,\rho(o) \tag{2}$$

as up to o orthogonal components of the input 3o-dimensional point are additively combined into one component of v. In some case, these components are equal to some value a, so their norm is $a\sqrt{o}$ but the length of their sum is ao. Therefore the $\ell_\infty$ search radius may be increased by a factor of $\sqrt{o}$ in order to ensure the point is found.

This transformation can be considered a linear, scale-preserving spatial hash. Hash collisions—two widely separated paths which map to nearby 3D points—are rare due to the relatively small radius search distance compared to typical scene size. When these collisions do occur, these pairs of paths are discarded when their $\ell_2$ distance is checked, so the final results are unaffected.

3.4 Path Merging

The path merging step has the simple function of combining nearby path candidates into single paths. Merely by way of example, identified nearby path candidates with respect to a receiver and a source may be averaged to generate a single path between the receiver and the source. It is understood that a (substantially) same resultant single path may be obtained by combining such nearby path candidates based on an algorithm other than averaging because from a given receiver, reflecting off any ordered set of convex submeshes, to a given source, there may only be at most one possible specular reflection path. Therefore, any candidates traversing this set of geometry may coincide with each other after refinement, to a degree of accuracy which can be as high as desired at the cost of more computation. Since the merge distance and refinement tolerance are related, the chances of incorrect merging of paths can also be theoretically reduced as far as desired. Incorrect merging is rare for another reason: not only may separate convex submeshes need to be very close to each other, but their normals may also need to be very similar, because otherwise the paths may diverge substantially after reflecting from the different normals.

The three radius search algorithms in Sec. 3.3 are used to find nearby paths. For the brute force approach, the paths are still assigned Morton numbers, and this list is sorted and culled, so that paths which are so close that they get the same Morton number are culled. The brute force search replaces only the expensive radius search step. With any of the three algorithms, a data structure representing path "adjacency"—sets of paths which are all near enough to each other to be merged—is formed. Since this data structure is being generated by thousands of threads in parallel, it may be built exclusively using atomic operations. The data structure is simply an integer for each path, representing the index of another path it is adjacent to, and initialized to −1 meaning "not adjacent to any path." The key insight is that each path can only be set to be adjacent to a path of a lower index than itself, so cycles in the adjacency graph cannot be formed (Alg. 1). Once the data structure is completed, paths which are marked as adjacent to other paths traverse the graph until they find the root (non-adjacent) node, and average their reflection positions into those of that path. Then these paths are discarded, leaving only the non-adjacent paths as the final set of paths for the current frame.

Alg. 1: Atomically constructing a path adjacency graph, ensuring cycles are not created. This code is run to mark paths s and t as adjacent. May be called by multiple threads.

```
Input: s,t : source, target path indices
Data: A[N_paths]: adjacency array of ints, init to −1
while s ≠ t do
  if s < t then
    s ← t, t ← s ;
  p ← atomicCAS (A[s],−1,t);
  if p = −1 then
    return;
  s ← p ;
end
```

3.5 Path Synchronization

The role of path synchronization is to connect paths generated in the previous frame to "the same" paths in the current frame. Formally, given a method for generating specular paths which is continuous almost everywhere with respect to movement of the scene contents (sources, meshes, and receivers), the scene is assumed to move continuously from its state in one frame to its state in the next frame, and as such almost all the paths may morph continuously from one frame to the next. When changes which are inherently not continuous occur, such as adding or removing sources or meshes, then the paths involving these items do not have corresponding paths in the other frame, and the path synchronization system may flag this for those paths.

Both the Morton number radius search and the RT core search (Section 3.3) may be implemented. Here also the identity of the receivers and sources are taken into account: for example, if source 0 was removed, then paths involving source 1 last frame may involve source 0 this frame. As a query path from the current frame receives "hits" on nearby paths from the previous frame, it keeps track of which not-yet-synchronized path is the closest in $\ell_2$ distance. When the query is finished, it atomically tries to synchronize with this path, and if the path has already been "claimed" by this time, the query is repeated. This method is not guaranteed to produce consistent results when the distance paths move between frames is similar to or greater than the separation between different paths in the same frame, in which case the assignments may be random depending on GPU thread scheduling. Fortunately, these cases are not very common in practice, and the details of reflections off small objects of sound from fast-moving sources may not matter in many applications. In principle, this problem can be solved by reducing the audio buffer size and simulating the scene more frequently, until the rate of change of path reflection positions per frame is as small as needed.

4 Spatial Sampling

Once reflection paths are generated, the path length and frequency response for each path may be computed. There are several factors which contribute to the frequency response in Space3D, including shadowed or near-shadowed diffraction as modeled by VDaT. In some embodiments of this document, only the reflection response due to the geometry shape (the equivalent of the BTM edge-diffraction response) is considered. In some embodiments, material-dependent filtering may be applied at each reflection point, with the materials defined at each vertex and interpolated between them according to the reflection point. These filters can be measured from real examples of the material, or synthesized typically as low-pass filters. This filtering can be seen as converting a single specular reflection path into a sum of specular and diffuse reflections, though this perspective is not strictly accurate for reflections above first order.

Figure 8:
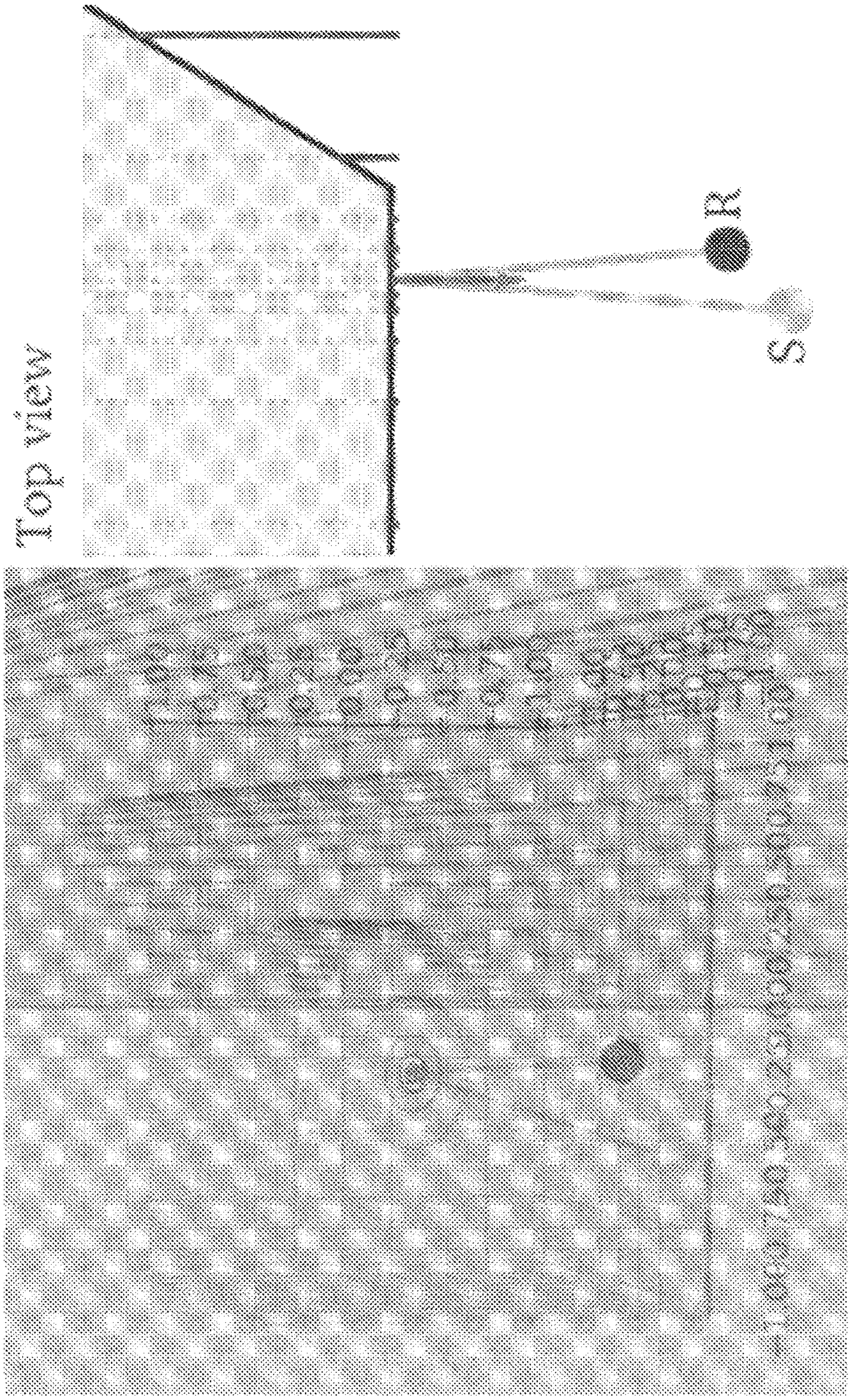
FIG. 8 shows SSNRD spatial sampling according to some embodiments of the present document.

The concept of modeling diffraction by spatial sampling was introduced in the Volumetric Diffraction and Transmission (VDaT) model, which was designed to approximate BTM results for shadowed and near-shadowed diffraction. If the occluding/reflecting object is planar, the BTM edge diffraction response, not including the direct path or geometric reflection path, is symmetrical over the plane. That is, the shadowed or near-shadowed diffraction response on one side of the object is the negative of the near-reflective diffraction response on the other side of the object, so effectively the pattern of energy reflected by a planar object is exactly the pattern of energy missing behind it. See Section 7. As a result, near-reflective diffraction may be modeled by running the VDaT algorithm on paths through the reflecting object and inverting the results. This produced vaguely reasonable results, but with poor accuracy, primarily because the numerical model in VDaT which approximates the BTM diffraction results from the spatial sampling results was not optimized to handle the situations encountered with reflections. Furthermore, an "inverted" VDaT model could not handle reflective geometry with obtuse angles like the example in FIG. 8, as all VDaT paths may be blocked and it may return a result of perfect reflections. FIG. 8 shows SSNRD spatial sampling according to some embodiments of the present document. Rays are traced into the scene, in a pattern of concentric cylinders around the reflection point. The distance each of these rays travels until it hits an object is measured.

In some embodiments, the basic spatial sampling framework from VDaT may be applied, with some changes and with the numerical modeling replaced with a small DNN (Section 5). A set of concentric cylinders of rays, usually centered at the reflection point (see Section 4.0.1), is traced into the scene, in the opposite direction of the reflection normal at the reflection point (FIG. 8). The distance each ray travels before intersecting any triangle is recorded, and this set of distances along all the rays is provided as the main input to the DNN. Measuring distance along rays is very straightforward with the RT core: the ray is defined as $\{p(t)=r_o+r_d \cdot t, \forall t \geq 0\}$ for ray origin $r_o$ and ray direction $r_d$, and when an intersection is reported, the intersecting t value is returned by the hardware. If $r_d$ is chosen to be a unit vector in scene units (meters), then the t value returned in the OptiX closest-hit program may be the distance along the ray to the nearest triangle in meters.

The radii of the cylinders are chosen to span the sound wavelengths of interest; here, nine cylinders are traced with power-of-2 spacing, plus there is one central ray. Each radius is $$r_i = c/f_i \tag{3}$$

where c is the speed of sound in air and $f_i=40 \cdot 2^i$ Hz; the central ray corresponds to 20480 Hz. The number of rays traced around each cylinder is an arbitrary quality parameter, here set to 64. Both the number and spacing of the radii and the number of rays per cylinder may be changed; this may involve a change in the input size of the DNN and retraining it.

The starting point of each ray is moved backwards until it is slightly behind the plane of the triangle with the intersection, or the plane perpendicular to the reflection normal, whichever is farther "back" (FIG. 9*a*). This is to ensure that the rays do not miss the reflecting object when the reflection normal is not perpendicular to the triangle. However, the distance along the ray before it intersects an object is considered zero where the ray crosses the plane perpendicular to the reflection normal, and this reflection distance is clamped to zero at minimum, so any intersections behind that plane are also considered at zero distance.

Figure 9:
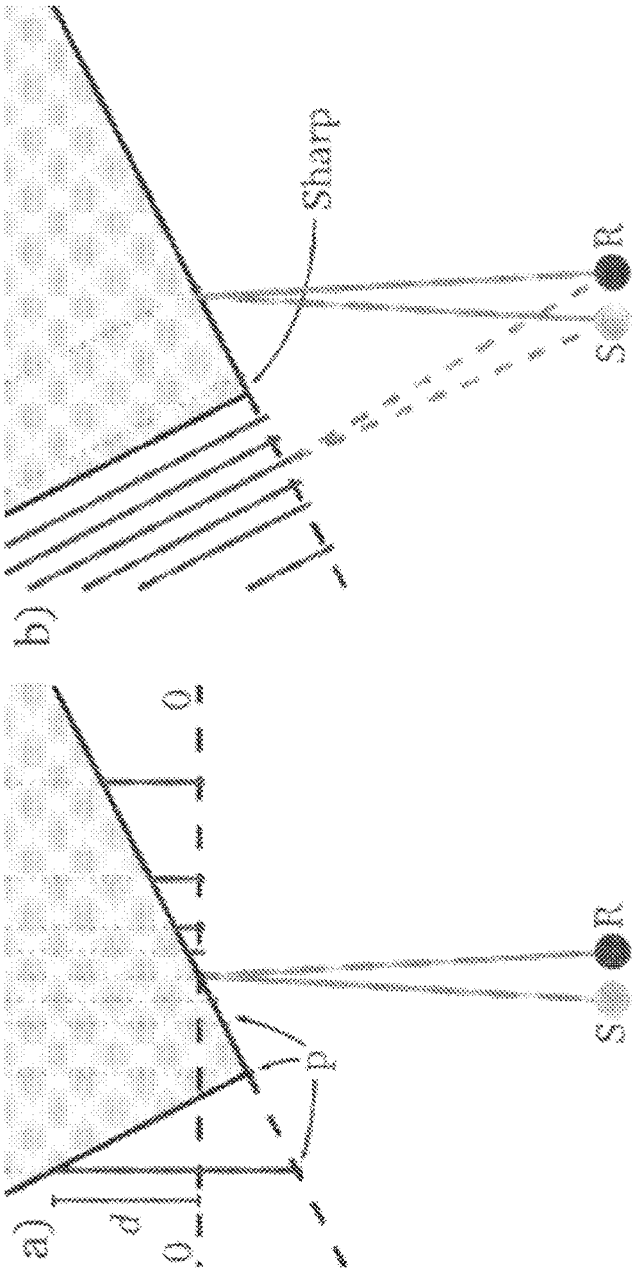
FIG. 9 shows spatial sampling according to some embodiments of the present document.

FIG. 9 shows spatial sampling according to some embodiments of the present document. In FIG. 9, (a) shows the start points of spatial sampling rays are moved back to slightly behind the plane of the reflecting triangle (p), so that they may start outside the object. However, distance is measured with zero at the plane perpendicular to the reflection normal (horizontal dashed line), so for example the length of the leftmost ray is returned as d; (b) shows if the edge is sharp, the SSNRD rays are traced with a center and direction as if the intersecting triangle was an infinite, flat plane.

4.0.1 SSNRD Center Point

For triangles with smooth edges, the center point of the cylinder of rays is the reflection point, and the normal is the reflection normal (FIG. 8 and FIG. 9*a*). However, for triangles with sharp (due to split vertices), concave, or disconnected edges, the center point is the reflection point off the triangle's flat plane, even if this point is outside of the triangle itself (FIG. 9*b*). Similarly, the normal (which the rays are traced in the opposite direction of) is the triangle's face normal vector. If a triangle has a mixture of smooth and "sharp" edges, these two cases are interpolated based on the distance of the flat reflection point to each vertex. This is done so that the spatial sampling can distinguish between reflections near smooth edges, which are supposed to approximate underlying smooth objects, and sharp edges, which are actually present in the acoustical scene. Note that in the sharp case, the path reflection point is not moved to this new position; it is only used for the spatial sampling. This is because the length (delay) of the reflection path may be based on the sound reflecting from the actual triangle, not a virtual extension of it.

5 DNN for Reflection Response

The spatial sampling results and some side-channel information are provided as inputs to a small (about 38 k parameters) feed-forward deep neural network (DNN). The output of this network is ten scalar values, representing amplitudes at each of ten frequencies spanning the audible spectrum (the same ten frequencies used for the radii of the spatial sampling cylinders in Section 4). The amplitude response of the reflection is piecewise linearly interpolated between these points. BTM amplitude responses of individual edges are smooth and can be approximated this way with minimal error. Sums of BTM responses for multiple edges usually contain interference, but it is infeasible to model the exact interference pattern (other than by computing the BTM results), and for interactive applications a smooth response may be desirable, as interference patterns can lead to audible comb filtering when objects move.

5.1 Network Architecture

The primary input data to the network—the distance along each spatial sampling ray $d(r,\theta)$—is organized using two-dimensional cylindrical coordinates, where one (angle θ) is a circular dimension (an angle of a spatial sampling ray on a specific cylinder) and the other (radius r) is a linear dimension (the radius of the specific cylinder), in which the distance is determined from the plane of intersection (the tangent plane at the point of intersection) along the cylinder (see Section 4, including FIG. 9 and relevant description thereof). Thus, a circular convolutional network architecture may be selected. Similar to a traditional convolutional neural network, in circular dimensions in the input space, the input is circularly padded before the convolution, enabling the convolutional kernel to wrap around from the end to the start and vice versa.

The range of these input distances is [0,∞), so they are converted to a more usable range (−1, 1] for the network:

$$d'(r,\theta)=2^{-d(r,\theta)/r}\cdot 2-1 \tag{4}$$

Figure 10:
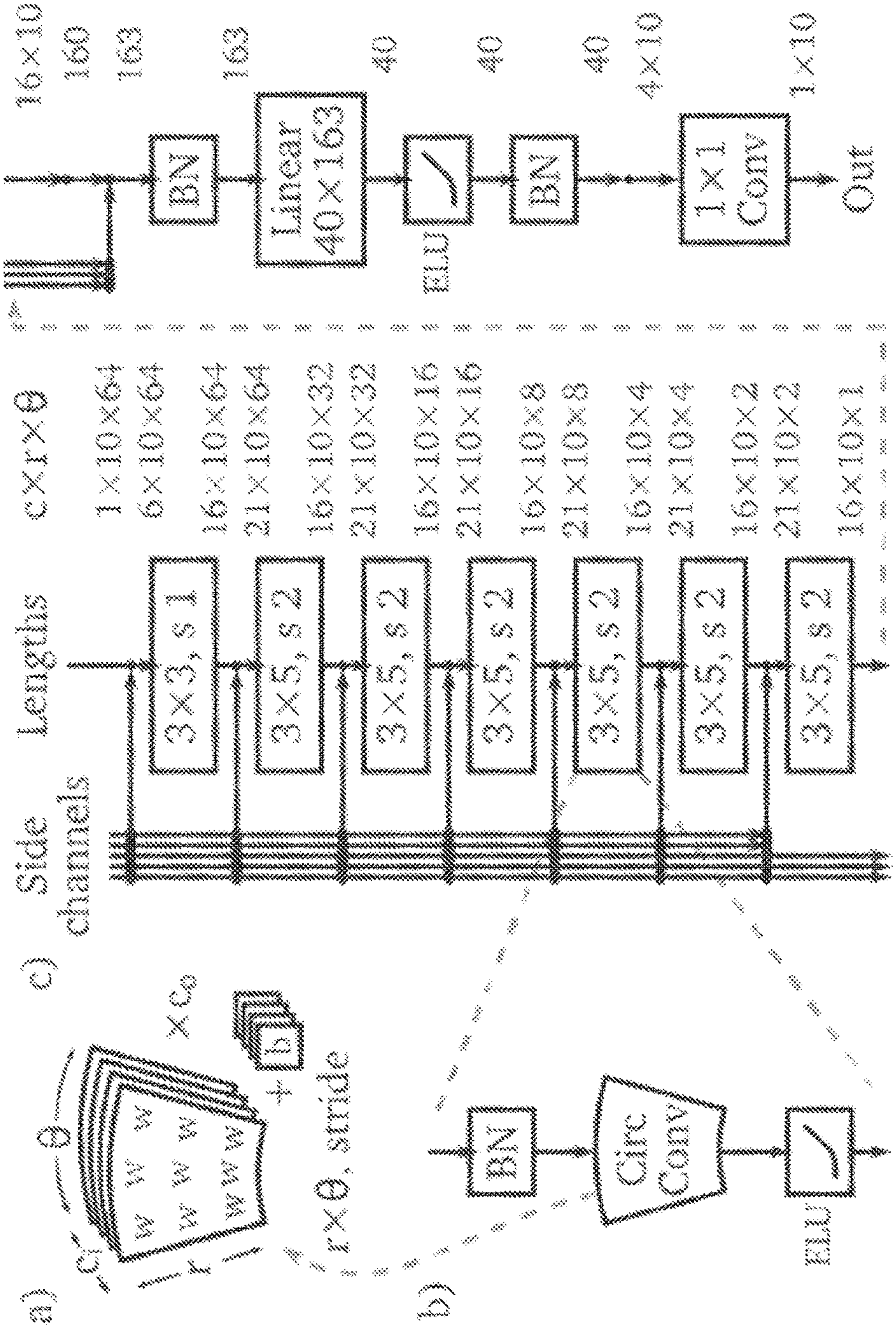
FIG. 10 shows an SSNRD DNN architecture according to some embodiments of the present document.

Five side channel inputs are also provided:

$$s(r,\theta)=\begin{bmatrix}\ln(l_s+l_r)\\ \Delta\ell=\dfrac{l_s}{l_s+l_r}\cdot 2-1\\ \cos(\phi)\\ \sin(\theta)\\ \cos(\theta)\end{bmatrix} \tag{5}$$

where $l_s$ and $l_r$ are the length of the source and receiver segments, respectively, and ϕ is the angle between the reflection normal and the source segment. The side channel inputs are concatenated along the channel dimension with the output of the previous layer (or d' for the first layer) as an input to each convolutional layer. Merely by way of example, each convolutional layer has 16 output channels and a kernel size of 3 in r with "replicate" padding. The first convolutional layer may have a kernel size of 3 in θ and a stride of 1, and all subsequent convolutional layers have a kernel size of 5 and a stride of 2, so that the size in the θ dimension is halved by these layers. These layers may be repeated until the θ dimension is 1 (FIG. 10). FIG. 10 shows an SSNRD DNN architecture according to some embodiments of the present document. (a) The convolutional kernel of a circular convolutional layer. (b) One layer of the network. (c) The overall network structure, showing the data tensor sizes after each operation.

After the convolutional portion of the network, the tensor dimensionality is $m\times16\times n_r$. This is put through a linear layer which maps $16\times n_r$ to $4\times n_r$, across all the radii (frequency bands). Finally, the tensor is put through a 1×1 convolutional layer which maps 4 channels to 1 using the same weights for each band. All of the convolutional and linear layers are preceded by batch normalization and followed by the exponential linear unit (ELU) activation function, except that ELU is omitted at the very end of the network.

The output y(r) is mapped to a change in amplitude response $$\Delta\hat{a}(r)=\begin{cases}\ln(y+1), & y\geq 0\\ y, & y<0\end{cases} \tag{6}$$

which is accumulated into the path's overall amplitude response. For example, if the path is a first-order reflection and there are no other filters applied (VDaT, materials, etc.), the path's final estimated amplitude response may be:

$$\hat{a}(r)=20\log\left(\frac{1}{l_s+l_r}\right)+\Delta\hat{a}(r) \tag{7}$$

Again, these ten r (radius) values map to octave frequency bands according to Eqn. 3.

5.2 Training Methodology

The training and test data for the DNN may be generated by a set of Python scripts (supplemental material) which simulate SSNRD spatial sampling and BTM edge diffraction in randomly generated scenes of certain types. Merely by way of example, four scene configurations were used (FIG. 11):

1) A sharp wedge, of a random angle between 1 and 179 degrees, with the edge length much larger than the longest wavelength of interest. The reflection point is uniformly distributed between 2 meters before and 2 meters after the edge.

2) A random, convex polygon disk, with a rough "radius" between 0.1 and 5 meters. The reflection point is a random distance (dependent on the radius) in a random direction from one of the edges.

3) An "icosphere" (polygonal approximation to a sphere), with the reflection point on one of its faces.

4) A "smooth edge," see below.

Figure 11:
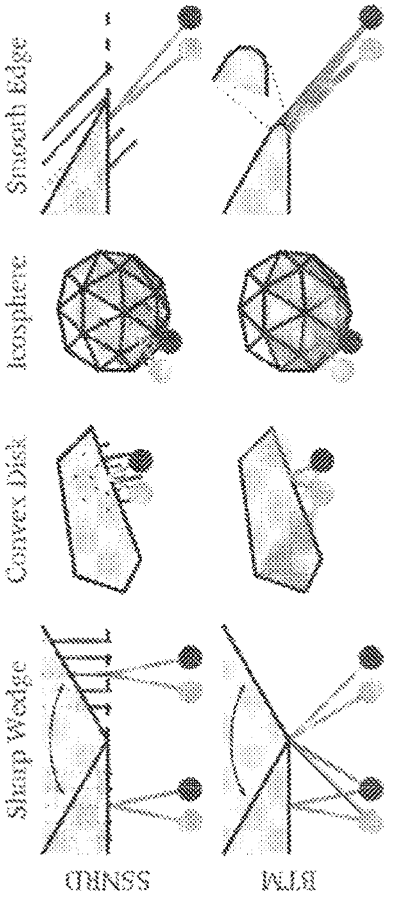
FIG. 11 shows example cases of the four scenarios used for training the SSNRD DNN according to some embodiments of the present document.

FIG. 11 shows example cases of the four scenarios used for training the SSNRD DNN according to some embodiments of the present document. The diagrams for Convex Disk and Icosphere are 3D front views; the others are 2D "edge-on" top views. The SSNRD sampling locations and 3D BTM edge diffraction paths are simplified for clarity.

In all cases the path length is uniformly distributed between 0.1 and 10 meters, and $\Delta\ell\in[-0.8, 0.8]$ (see Eqn. 5) except in case 4 where $\Delta\ell=0$. Also, the direction from the intersection point to the source is random, with a weighting so that closer to perpendicular to the surface is more common.

The "smooth edge" scenario is intended to reflect the way that SSNRD path generation handles reflections smoothly interpolating around edges (Section 2.2). A smooth edge in SSNRD is intended to approximate a curved surface, so it may be trained to match BTM results for the curved surface, not BTM results for a single edge. Thus, the spatial sampling results in this scenario are generated from a wedge mesh with a single smooth edge (Section 4), but the BTM results are generated from a mesh with a polygonal "curved" surface consisting of a few segments where the original edge was (FIG. 11 lower right).

Training, validation, and test data were all generated from these scripts, with the quantities of each type in the training set shown in Table 1. Because all the examples were randomly generated, the training and test sets are disjoint. Furthermore validation sets were used when adjusting the network architecture and hyperparameters; only once the final network was settled on and trained was the test set generated and evaluated, with no parameters adjusted after that time.

TABLE 1

| SSNRD Network Scene Configurations and Test Set Error | | |
|---|---|---|
| Scene | # Training | Test MAE |
| Sharp Wedge | 4000 | 1.50 dB |
| Convex Disk | 16000 | 1.94 dB |
| Icosphere | 1600 | 1.75 dB |
| Smooth Edge | 4000 | 1.21 dB |

The loss function is mean absolute error (MAE) between the estimated path amplitude response Eqn. 7 at the ten frequencies f and the BTM amplitude response "near" those frequencies, obtained by convolving the BTM amplitude response $a_{BTM}$ (ω) with Gaussians as $$a_{BTM}(f) = \sum_{\omega=0}^{N_\omega-1} a_{BTM}(\omega)\, e^{-\frac{1}{2}(\log_2 \omega - \log_2 f)^2} \quad (8)$$

For the BTM ground truth, the sum of the geometrical reflection path if present plus all first-order BTM paths was used. Second-order BTM may be implemented. In some case, the contribution from the second-order BTM may be negligible to the overall results while taking much more time to generate. So in some embodiments, the second-order BTM may be omitted.

Merely by way of example, the network may be trained with a batch size of 128, learning rate of $l(e)=0.01\cdot0.97^e$ for epoch e for 300 epochs, and the Adam optimizer with weight decay of $10^{-5}$. Training may take roughly an hour on one NVIDIA GeForce RTX 3080 GPU, using TensorFloat-32 computations for the convolutional and linear layers. For inference, the network may be hand-implemented in CUDA as a single kernel, to avoid the performance penalty of copying data to memory between kernels performing individual operations in the network, and to avoid introducing a dependency on the very large libtorch library. This implementation may miss the advantage of the Tensor Cores present in recent NVIDIA GPU architectures, so when there are more than a few hundred reflection points, the DNN inference may become a bottleneck for the system's real-time performance. In some embodiments, optimized Tensor Core matrix multiply routines may be integrated into a single-kernel DNN implementation.

5.3 Results

Figure 12:
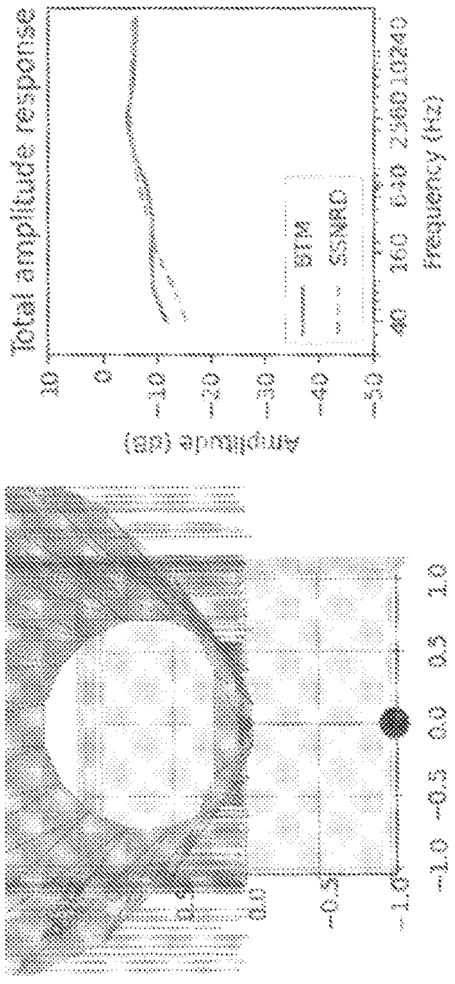
FIG. 12 shows example SSNRD network results for a reflection off a 1-m radius cylinder, with 1.3 dB mean absolute error compared to the BTM result according to some embodiments of the present document.

Test set results, averaged over 1000 examples of each of the four trained scene configurations, are shown in Table 1. The mean absolute error (MAE) between the SSNRD and BTM results is less than 2 dB on average for all four types of scenes. The error is largest when the source or receiver is close to the reflection plane due to Δ $\ell$ or ϕ being large (Eqn. 5). The right plot in FIG. 1 shows the SSNRD results as the source and receiver are moved past the edge, showing good agreement with the BTM results as well as smooth behavior as the inputs change. FIG. 12 shows example results from SSNRD and BTM for a reflection from a cylinder, which is a type of scene the network never saw during training (the training set did not include any cylinders). Nevertheless, the error in the SSNRD results is only 1.3 dB.

6 System Results

All timing results are measured on one NVIDIA GeForce RTX 3080 GPU. Table 2 shows the time taken to preprocess some large meshes (Section 2). The algorithms are fast enough to be run every frame when meshes are deformed, and the time appears to scale linearly with the scene size after an initial overhead. Table 3 shows example results for the three radius search algorithms in Section 3.3. Except for small problem sizes, the RT Gore implementation outperforms the Morton number based radius search, because the traversal of the scene structure is done in hardware. Table 4 shows example timing results for various processing steps discussed above in three medium-to-large scenes. The timings can change substantially depending on the scene geometry, source and receiver placement, and quality parameters. Nevertheless, these results are representative of the performance of each of these algorithms in real-world use: they are fast enough to be used in interactive applications, and only mildly dependent on the scene size.

TABLE 2

| Mesh Preprocessing Performance Examples | | | | |
|---|---|---|---|---|
| Scene | # Tris | Connectivity (RT Core) | Conn time/ million tris | Vertex Normals |
| Kitchen 2 | 135k | 820 µs | 6.1 ms/M | 681 µs |
| Bedroom 3 | 945k | 2.8 ms | 3.0 ms/M | 1.3 ms |
| Kitchen 3 | 1.62M | 5.9 ms | 3.6 ms/M | 3.7 ms |
| Office 8 | 3.08M | 9.9 ms | 3.2 ms/M | 5.7 ms |

TABLE 3

| Radius Search Performance Examples | | | |
|---|---|---|---|
| | Time for Algorithm, ±20 µs/±3% | | |
| Scenario | Morton cull + Brute force | Morton cull + Morton search | RT Core |
| Path Merge, # candidates → # paths | | | |
| 577 → 172 | 235 µs | 957 µs | 773 µs |
| 1956 → 667 | 395 µs | 1108 µs | 835 µs |
| 4741 → 1941 | 638 µs | 1202 µs | 842 µs |
| Path Sync, # cur frame to last frame links | | | |
| 161 | — | 322 µs | 568 µs |
| 673 | — | 843 µs | 613 µs |
| 1848 | — | 2108 µs | 689 µs |

TABLE 4

| Path Generation Performance Examples | | | |
|---|---|---|---|
| Scene | Sibenik | Sponza | Living Room 3 |
| # Tris | 76.6k | 262k | 1.42M |
| Order, # Srcs | 5, 1 | 3, 8 | 6, 2 |
| $n_R$, $n_B$, $\hat{d}_{max}$ (1) | 40k, 16, 50 | 80k, 8, 13.1 | 40k, 32, 13.1 |
| Path Cand. | 3269 | 10569 | 8020 |
| Paths | 316 | 2655 | 1389 |
| BVH/setup | 185 µs | 217 µs | 216 µs |
| Ray Tracing | 1665 µs | 1447 µs | 3630 µs |
| Refinement | 487 µs | 325 µs | 570 µs |
| Path Merge | 270 µs | 495 µs | 438 µs |
| Spat. Sampl. | 196 µs | 693 µs | 602 µs |
| VDaT | 585 µs | 2931 µs | 2192 µs |
| Path Sync | 470 µs | 552 µs | 550 µs |

All cases: $\hat{d}_{max}$ ({2, 3, 4, 5, 6}) = {1.5, 2, 2.5, 3, 3.5} · $\hat{d}_{max}$ (1), $n_T$ = 49. See Section 3.1 for explanations of params.

Figure 13:
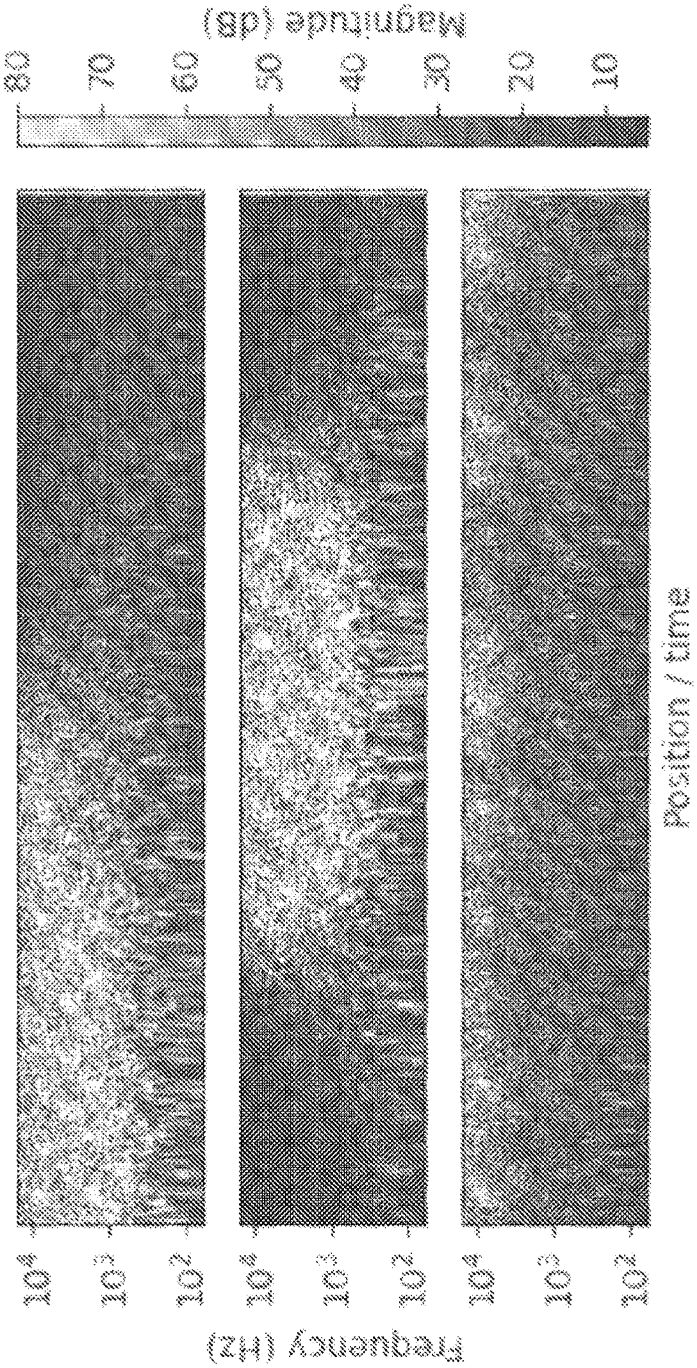
FIG. 13 shows spectrograms of Space3D output for white noise input, colocated source and receiver, and a single first-order reflection path off three different meshes according to some embodiments of the present document.

FIG. 13 shows three cases of Space3D system output for white noise input, colocated source and receiver, and a single first-order reflection path off three different meshes according to some embodiments of the present document. In FIG. 13, top: source and receiver move past the edge of a large plane (same as FIG. 1); middle: source and receiver move past a cube; bottom: a 1-m radius icosphere rotates in front of the source and receiver. In the first two cases illustrated in the top and middle panels of FIG. 13, the response smoothly fades at the edges, with the high frequencies changing over a shorter distance than the low frequencies. In the icosphere case illustrated in the bottom panel, the high frequency response changes depending on how close the reflection is to the center of a face versus an edge. Nevertheless, these changes are smooth as the mesh rotates, and at low frequencies where the wavelength is large compared to the size of the sphere, there is relatively little reflection energy.

7. Edge Diffraction Symmetric for Convex Planar Geometry

According to the Biot-Tolstoy-Medwin (BTM) edge diffraction model, the total impulse response (IR) $\bar{h}(\tau)$ is equal to the geometrical acoustics (GA) components plus the BTM diffraction component:

(1)

$$\bar{h}_{shd} = h_{BTM,shd} \tag{10}$$

(2)

$$\bar{h}_{nsd} = h_{dir} + h_{BTM,nsd} \tag{11}$$

(3)

$$\bar{h}_{nrd} = h_{BTM,nrd} \tag{12}$$

Figure 14:
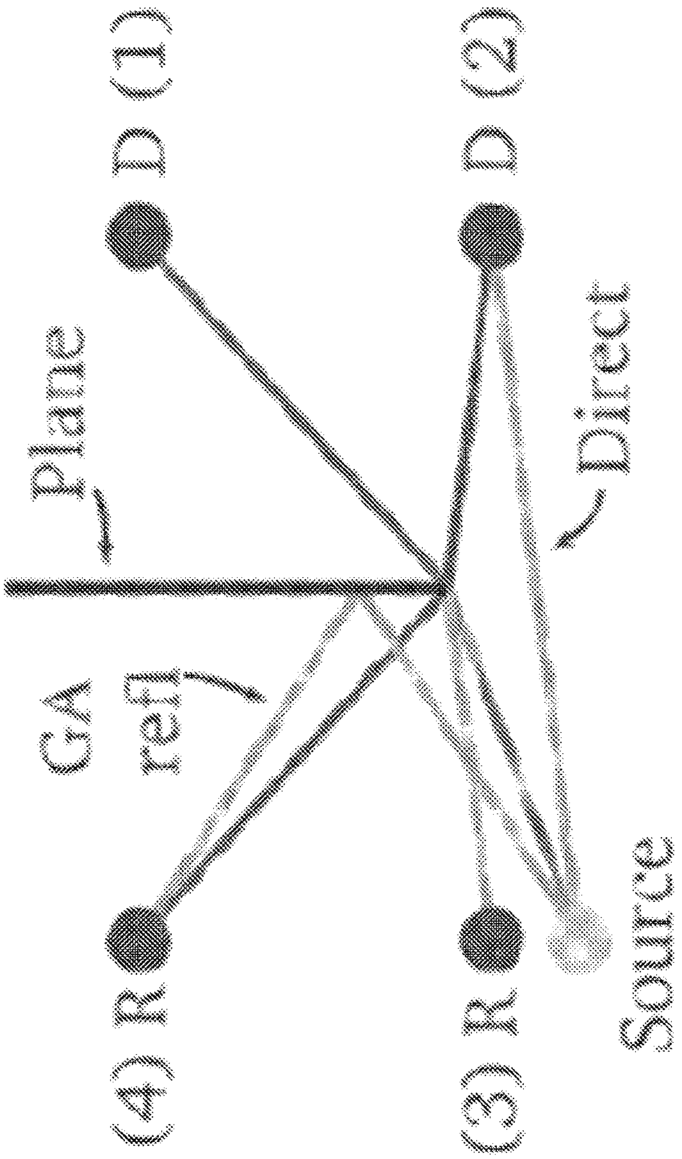
FIG. 14 shows four cases of BTM edge diffraction around a planar object according to some embodiments of the present document.

(4)

$$\bar{h}_{rfd} = h_{refl} + h_{BTM,rfd} \tag{13}$$

corresponding to the numbered cases in FIG. 14 for shadowed diffraction, near-shadowed diffraction, near-reflective diffraction without a reflection path, and near-reflective diffraction with a reflection path. It is assumed that the object has rigid surfaces and does not have any absorption or transmission.

The pattern of energy removed from the field behind the occluder—i.e., the IR without the occluder, minus the diffraction IR—may be equal to the pattern of the specularly reflected energy. When the reflection receiver is at the image of the diffraction receiver, the conditions for shadowed diffraction for one edge are the same as the conditions for a valid GA specular reflection path (FIG. 14), so there are only two cases, Equations (10) and (13), or Equations (11) and (12):

$$h_{dir} - \bar{h}_{shd} \stackrel{?}{=} \bar{h}_{rfd} \tag{14}$$

$$h_{dir} - \bar{h}_{nsd} \stackrel{?}{=} \bar{h}_{nrd} \tag{15}$$

$h_{dir}$ when the occluder is not present is equal to $h_{refl}$ when the occluder is present, as both are GA paths of the same length without any modified frequency response, and the reflection from the rigid surface does not introduce a phase inversion. Substituting Equations 10-13, Equations 14 and 15 reduce to:

$$h_{BTM,shd} \stackrel{?}{=} -h_{BTM,rfd} \tag{16}$$

$$-h_{BTM,nsd} \stackrel{?}{=} h_{BTM,nrd} \tag{17}$$

or more generally $$h_{BTM,diff} \stackrel{?}{=} -h_{BTM,refl} \tag{18}$$

where $h_{BTM,diff}$ is the BTM impulse response (without GA components) on the diffraction side, and $h_{BTM,refl}$ is the corresponding response for an appropriate position on the reflection side.

It can be shown that Eqn. 18 is not true for non-planar geometry, regardless of the choice of receiver positions. However, it is conjectured that:

Conjecture 1. If the occluder is planar and the reflection receiver is at the image of the diffraction receiver (i.e., reflected across the plane), Eqn. 18 holds.

Conjecture 1 is proved below for general first-order diffraction (Section 7.1) and for second-order diffraction from convex occluders (Section 7.2). It is conjectured to also hold for all higher orders of BTM edge diffraction and for non-convex planar occluders (Section 7.3).

7.1 First-Order Diffraction 7.1.0.1 Infinite half-plane: The BTM IR for the infinite wedge may be given as $$h_{BTM}(\tau) = -\frac{cv}{2\pi}\frac{\beta(\tau)}{r_S r_R \sinh\eta(\tau)}H(\tau-\tau_0) \tag{19}$$

$$\eta(\tau) = \cosh^{-1}\frac{c^2\tau^2 - \left(r_S^2 + r_R^2 + z_R^2\right)}{2r_S r_R} \tag{20}$$

$$\beta(\tau) = \beta_{++}(\tau) + \beta_{+-}(\tau) + \beta_{-+}(\tau) + \beta_{--}(\tau) \tag{21}$$

$$\beta_{\pm\pm}(\tau) = \frac{\sin(v(\pi \pm_1 \theta_S \pm_2 \theta_R))}{\cosh(v\eta(\tau)) - \cos(v(\pi \pm_1 \theta_S \pm_2 \theta_R))} \tag{22}$$

where H is the Heaviside step function, $v=\pi/\theta_W$ is the "wedge index," and $\theta_W$ is the open angle of the wedge. The only term here which is dependent on $\theta_S$ and $\theta_R$, the source and receiver angles, is $\beta(\tau)$. For clarity, the following equations are provided $$\beta_{\pm\pm}(\tau) = \frac{N}{C+M} \tag{23}$$

$$C = \cosh(v\eta(\tau)) \tag{24}$$

$$\begin{matrix} N \\ M \end{matrix} = \begin{matrix} \sin \\ -\cos \end{matrix}\left(\pi\left(\frac{\pi}{\theta_W}\right) \pm_1 \left(\frac{\theta_S}{\theta_W}\right) \pm_2 \left(\frac{\theta_R}{\theta_W}\right)\right) \tag{25}$$

since most of the manipulations may be analogous on numerator and denominator.

For a planar "wedge," $\theta_W=2\pi$ so $$\begin{matrix} N \\ M \end{matrix} = \begin{matrix} \sin \\ -\cos \end{matrix}\left(\frac{\pi}{2} \pm_1 \frac{\theta_S}{2} \pm_2 \frac{\theta_R}{2}\right) \tag{26}$$

$$= \begin{matrix} \cos \\ \sin \end{matrix}\left(\pm_1 \frac{\theta_S}{2} \pm_2 \frac{\theta_R}{2}\right) \tag{27}$$

These equations are valid for source and receiver points. Assuming that R is the reflection receiver, whose impulse response contains β term $\beta_{refl}$, and D is the diffraction receiver with β term $\beta_{diff}$. The position D is R reflected over the plane, so $\theta_D=2\pi-\theta_R$. Substituting:

$$\frac{N_D}{M_D} = \frac{\cos}{\sin}\left(\pm_1 \frac{\theta_S}{2} \pm_2 \frac{2\pi}{2} \mp_2 \frac{\theta_R}{2}\right) = \frac{-\cos}{-\sin}\left(\pm_1 \frac{\theta_S}{2} \mp_2 \frac{\theta_R}{2}\right) = \frac{-\cos}{-\sin}\left(-\left(\mp_1 \frac{\theta_S}{2} \pm_2 \frac{\theta_R}{2}\right)\right) = \frac{-\cos}{\sin}\left(\mp_1 \frac{\theta_S}{2} \pm_2 \frac{\theta_R}{2}\right)$$

$$\beta_{diff;\pm\pm} = \frac{-\cos(\mp_1 \theta_S/2 \pm_2 \theta_R/2)}{C + \sin(\mp_1 \theta_S/2 \pm_2 \theta_R/2)} = -\beta_{refl;\mp\pm}$$

Since all four combinations of the $\pm_1\pm^2$ terms are summed, swapping the first ± simply swaps the additions, giving the same result. So, $\beta_{diff}=-\beta_{refl}$. Since β contributes multiplicatively to $h_{BTM}$ and no other term depends on $\theta_R$, $$h_{BTM;diff} = -h_{BTM;refl} \tag{28}$$

7.1.0.2 Finite and non-straight edges: below is an example expression of the diffracted pressure p(t) from a finite edge which need not be straight, depending on whether integration is performed in time or along the edge:

$$p(t) = \frac{-v}{4\pi}\int_{z_1}^{z_2} q\left[t - \frac{m(z)+l(z)}{c}\right]\frac{\beta}{m(z)l(z)}dz \tag{29}$$

where q(t) is the source signal. This uses a different form of β, $\beta(\alpha(z),\gamma(z),\theta_S,\theta_R)$, but this change only affects the C term from Eqn. 24, not the terms containing $\theta_S$ and $\theta_R$. So, the analysis above remains valid; $\beta_{diff}=-\beta_{refl}$, and since the negative sign can still be pulled out from β to the result, Eqn. 28 still holds.

7.2 Second-Order Diffraction

Eqn. 29 is an example equation for second-order diffraction. This equation is valid whenever the diffraction path between the two edges lies along a surface, which is always true for convex objects (whether planar or not).

The below proceeds a version of the equations relating to Equation (29):

$$\beta_{\pm\pm;n}(\tau) = \frac{N_n}{C_n + M_n} \tag{30}$$

$$C_1 = \cosh(v\eta(\alpha_1(z_1), \gamma_1(z_1, z_2))) \tag{31}$$

$$C_2 = \cosh(v\eta(\alpha_2(z_1, z_2), \gamma_2(z_2))) \tag{32}$$

$$\frac{N_1}{M_1} = \frac{\sin}{-\cos}\left(\pi\left(\frac{\pi}{\theta_{W1}}\right) \pm_1 \left(\frac{\theta_{S1}}{\theta_{W1}}\right) \pm_2 \left(\frac{\theta_{W1}}{\theta_{W1}}\right)\right) \tag{33}$$

$$= \frac{-\sin}{\cos}\left(\pi\left(\frac{\pi}{\theta_{W1}} \pm_1 \frac{\theta_{S1}}{\theta_{W1}}\right)\right) \tag{34}$$

$$\frac{N_2}{M_2} = \frac{\sin}{-\cos}\left(\pi\left(\frac{\pi}{\theta_{W2}}\right) \pm_1 \left(\frac{0}{\theta_{W2}}\right) \pm_2 \left(\frac{\theta_{W2}-\theta_{R2}}{\theta_{W2}}\right)\right) \tag{35}$$

$$= \frac{-\sin}{\cos}\left(\pi\left(\frac{\pi}{\theta_{W2}} \mp_2 \frac{\theta_{R2}}{\theta_{W1}}\right)\right) \tag{36}$$

Given that the obstacle is planar, $\theta_{W1}=\theta_{W2}=2\pi$, so $$\frac{N_1}{M_1} = \frac{-\sin}{\cos}\left(\pi\left(\frac{1}{2} \pm_1 \frac{\theta_{S1}}{2\pi}\right)\right) \tag{37}$$

$$= \frac{-\cos}{-\sin}\left(\pm_1 \frac{\theta_{S1}}{2}\right) \tag{38}$$

and similarly $$\frac{N_2}{M_2} = \frac{-\cos}{-\sin}\left(\mp_2 \frac{\theta_{R2}}{2}\right) \tag{39}$$

Now assuming the receiver R2 is at the end of a near-reflective diffraction path, i.e., on the same side of the obstacle as source S1. The IR may be compared to that of the diffraction path with receiver D2, corresponding to R2 reflected over the plane, so $\theta_{D2}=2\pi-\theta R2$. The $N_1$, $M_1$, and $\beta_{\pm\pm;1}$ terms do not change, so $$\frac{N_{2;diff}}{M_{2;diff}} = \frac{-\cos}{-\sin}\left(\mp_2 \frac{2\pi-\theta_{R2}}{2}\right) \tag{40}$$

$$= \frac{\cos}{\sin}\left(\pm_2 \frac{\theta_{R2}}{2}\right) \tag{41}$$

$$= \frac{\cos}{-\sin}\left(\mp_2 \frac{\theta_{R2}}{2}\right) \tag{42}$$

$$N_{2;diff} = -N_{2;refl} \tag{43}$$

$$M_{2;diff} = M_{2;refl} \tag{44}$$

Since the numerators are negated and the denominators are the same for all of the ± combinations being summed, $\beta_{\pm\pm;2;diff}=-\beta_{\pm\pm;2;refl}$. Like for first-order diffraction, β contributes multiplicatively to the final IR, and no other terms in the IR depend on $\theta_{R2}$, so $$p_{BTM;diff;2nd}(t) = -p_{BTM;refl;2nd}(t) \tag{45}$$

(second order) given the same source signal q(t) and any convex planar occluder.

0.3 Non-Convex Geometry

Compared to the analytical solution and measurement results, the BTM secondary source formulation may omit components in certain cases where the diffraction path travels from one edge to another not along a surface. This can only happen in second or higher order diffraction in a non-convex scene. More specifically, BTM predicts that for a gap in a planar occluder, the first-order diffraction from one edge has a zero magnitude at the other edge, so there is no second or higher order diffraction. However, this first-order diffracted component violates the boundary condition on the plane forming the other edge, so there may be a higher-order component to compensate for this. This is a limitation of BTM, but this does not mean that Conjecture 1 is necessarily violated for this non-convex geometry, just that BTM cannot model this case.

8 Concluding Remarks

A method for generating and simulating the response of specular reflection paths in acoustical scenes is presented. This method may smoothly fade the amplitude response of reflection paths as they cross edges, take into account the size and shape of nearby geometry at a reflection point, and distinguish polygonal meshes representing smooth surfaces from those representing real edges. It achieves these goals through a combination of specific path generation methods, spatially sampling the scene with rays around reflection points, and approximating ground-truth edge diffraction results to within 1-2 dB with a DNN. The algorithms are fast enough to be used in interactive applications, partly thanks to NVIDIA's RT core, which is used for radius search and computing mesh connectivity in addition to traditional ray tracing.

Figure 15:
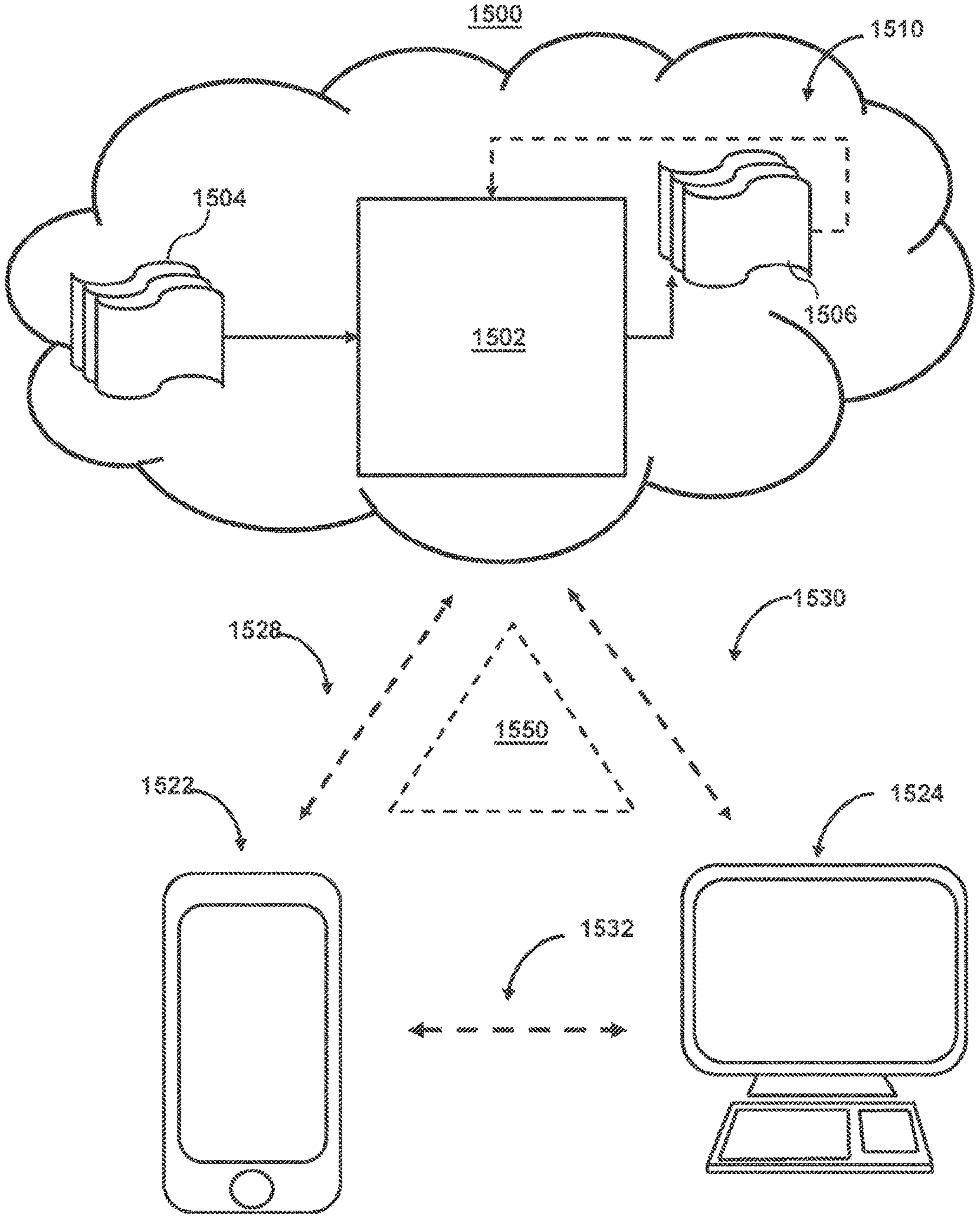
FIG. 15 shows illustrative components for performing sound generation (or simulation), in accordance with some embodiments.

FIG. 15 shows illustrative components for performing sound generation (or simulation), in accordance with some embodiments. As shown in FIG. 15, system 1500 may include mobile device 1522 and user terminal 1524. While shown as a smartphone and personal computer, respectively, in FIG. 15, it should be noted that mobile device 1522 and user terminal 1524 may be any computing device, including, but not limited to, a laptop computer, a tablet computer, a handheld computer, and other computer equipment (e.g., a server), including "smart," wireless, wearable, and/or mobile devices. FIG. 15 also includes cloud components 1510. Cloud components 1510 may alternatively be any computing device as described above, and may include any type of mobile terminal, fixed terminal, or other device. For example, cloud components 1510 may be implemented as a cloud computing system, and may feature one or more component devices. It should also be noted that system 1500 is not limited to three devices. Users may, for instance, utilize one or more devices to interact with one another, one or more servers, or other components of system 1500. It should be noted, that, while one or more operations are described herein as being performed by particular components of system 1500, these operations may, in some embodiments, be performed by other components of system 1500. As an example, while one or more operations are described herein as being performed by components of mobile device 122, these operations may, in some embodiments, be performed by components of cloud components 1510. In some embodiments, the various computers and systems described herein may include one or more computing devices that are programmed to perform the described functions. Additionally, or alternatively, multiple users may interact with system 1500 and/or one or more components of system 1500. For example, in one embodiment, a first user and a second user may interact with system 1500 using two different components.

With respect to the components of mobile device 1522, user terminal 1524, and cloud components 1510, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 15, both mobile device 1522 and user terminal 1524 include a display upon which to display data (e.g., notifications).

As referred to herein, a "user interface" may comprise a human-computer interaction and communication in a device, and may include display screens, keyboards, a mouse, and the appearance of a desktop. For example, a user interface may comprise a way a user interacts with an application or a website. A notification may include any content.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

Additionally, as mobile device 1522 and user terminal 1524 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 100 may run an application (or another suitable program). The application may cause the processors and/or control circuitry to perform operations related to sound generation or simulation, generating dynamic replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., electrically erasable programmable read-only memory (EEPROM), random-access memory (RAM), etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

For example, each of these devices may comprise a knowledge database that represents data and/or metadata on previously developed models (e.g., when the respective models were generated or updated, parameters of such models, the performance of the respective models, etc.). The knowledge database may include archived information related to potential model uses, maintenance, and/or updates. Additionally, or alternatively, the knowledge database may include archived information related to training data used in previous model training, maintenance, and/or updates. For example, this information may include one or more algorithms and relevant parameters of the algorithm(s) generated in generating acoustical scenes as training data.

FIG. 15 also includes communication paths 1528, 1530, and 1532. Communication paths 1528, 1530, and 1532 may include the Internet, a mobile phone network, a mobile voice or data network (e.g., a 5G or Long Term Evolution (LTE) network), a cable network, a public switched telephone network, or other types of communications networks or combinations of communications networks. Communication paths 1528, 1530, and 1532 may separately or together include one or more communications paths, such as a satellite path, a fiber-optic path, a cable path, a path that supports Internet communications (e.g., Internet Protocol television (IPTV)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 1510 may include model 1502, which may include one or more machine learning models or engines, artificial intelligence models or engines, etc. (which may be referred to collectively herein as "models"). Model 1502 may take inputs 1504 and provide outputs 1506. The inputs may include multiple data sets, such as a training data set and a test data set. Each of the plurality of data sets (e.g., inputs 1504) may include an event data set related to an event. In some embodiments, outputs 1506 may be fed back to model 1502 as input to train model 1502 (e.g., alone or in conjunction with user indications of the accuracy of outputs 1506, labels associated with the inputs, or with other reference feedback information). In some embodiments, system 1500 may use model 1502 for performing interactive sound simulation in a virtual environment (e.g., gaming).

System 1500 may also include Application Programming Interface (API) layer 1550. API layer 1550 may allow the system to generate summaries across different devices. In some embodiments, API layer 1550 may be implemented on mobile device 1522 or user terminal 1524. Alternatively, or additionally, API layer 1550 may reside on one or more of cloud components 1510. API layer 1550 (which may be a Representational state transfer (REST) or web services API layer) may provide a decoupled interface to data and/or functionality of one or more applications. API layer 1550 may provide a common, language-agnostic way of interacting with an application. Web services APIs offer a well-defined contract, called Web Services Description Language (WSDL), that describes the services in terms of its operations and the data types used to exchange information. REST APIs do not typically have this contract, instead, they are documented with client libraries for most common languages, including Ruby, Java, PHP, and JavaScript. Simple Object Access Protocol (SOAP) Web services have traditionally been adopted in the enterprise for publishing internal services, as well as for exchanging information with partners in B2B transactions.

API layer 1550 may use various architectural arrangements. For example, system 1500 may be partially based on API layer 1550, such that there is strong adoption of SOAP and RESTful web services, using resources like Service Repository and Developer Portal, but with low governance, standardization, and separation of concerns. Alternatively, system 1500 may be fully based on API layer 1550, such that separation of concerns between layers like API layer 1550, services, and applications are in place.

In some embodiments, the system architecture may use a microservice approach. Such systems may use two types of layers: front-end layer and back-end layer, where microservices reside. In this kind of architecture, the role of the API layer 150 may provide integration between the front-end layer and back-end layer. In such cases, API layer 150 may use RESTful APIs (exposition to front-end or even communication between microservices). API layer 150 may use Advanced Message Queuing Protocol (AMQP) (e.g., Kafka, RabbitMQ, etc.). API layer 150 may use incipient usage of new communications protocols, such as gRPC, Thrift, etc.

In some embodiments, the system architecture may use an open API approach. In such cases, API layer 150 may use commercial or open source API platforms and their modules. API layer 150 may use a developer portal. API layer 150 may use strong security constraints applying web application firewall (WAF) and Distributed denial of service (DDoS) protections, and API layer 150 may use RESTful APIs as standard for external integration.

In some embodiments, an interactive application may be implemented on system 1500. Merely by way of example, a game engine may be implemented on system 1500 (e.g., the cloud component 1510). The game engine may include or be communicatively coupled to a sound simulation device or engine (e.g., the model 1502 of the cloud component 1510). The game engine and the sound simulation engine implemented on the cloud component 1510 of the system 1500 may communicate with a user terminal where a user plays a game run on the game engine and the sound simulation engine. In some embodiments, at least a portion of the interactive application may be implemented on a local machine including one or more processors and at least one or more storage devices.

Figure 16:
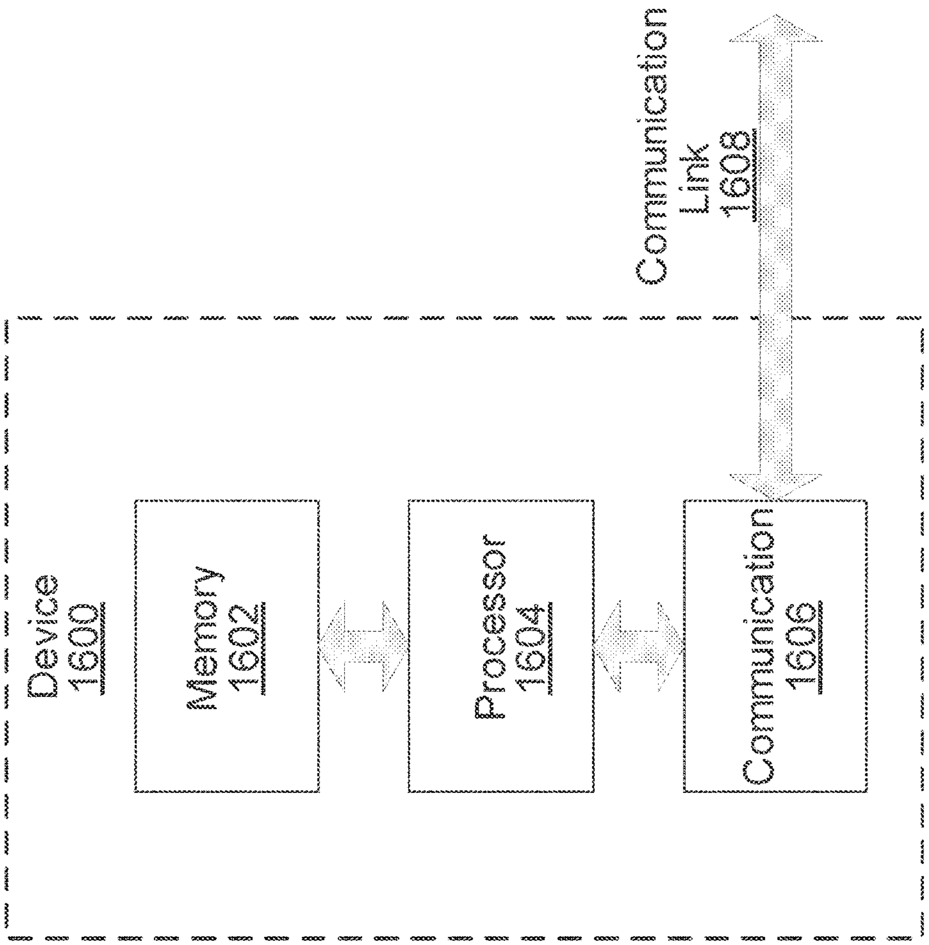
FIG. 16 illustrates a block diagram of a device which can be used to implement, at least in-part, some embodiments of the present document.

FIG. 16 illustrates a block diagram of a device 1600 which can be used to implement, at least in-part, some embodiments of the present document. The device in FIG. 16 can, for example, be implemented as a part of a sound generation system or as a part of an AR/VR system. The device 1600 may include at least one processor or controller 1604 (e.g., GPU), at least one memory unit 1602 that is in communication with the at least one processor 1604, and at least one communication unit 1606 that enables exchange of data and information, directly or indirectly, through the communication link 1608 with other entities, devices, databases and networks. The communication unit 1606 may provide wired and/or wireless communication capabilities in accordance with one or more communication protocols, and therefore it may comprise the corresponding transmitter/receiver, antennas, circuitry and ports, as well as the encoding/decoding capabilities that may be necessary for transmission and/or reception of data and other information. The example device 1600 of FIG. 16 may be integrated as part of any device or system according to the disclosed technology to carry out any of the disclosed methods, including receiving information and/or electrical signals corresponding to a scene around the device 1600, for example (and/or corresponding to a virtual scene), and processing those signals and information to implement any of the methods according to the technology disclosed in this patent document.

Figure 17:
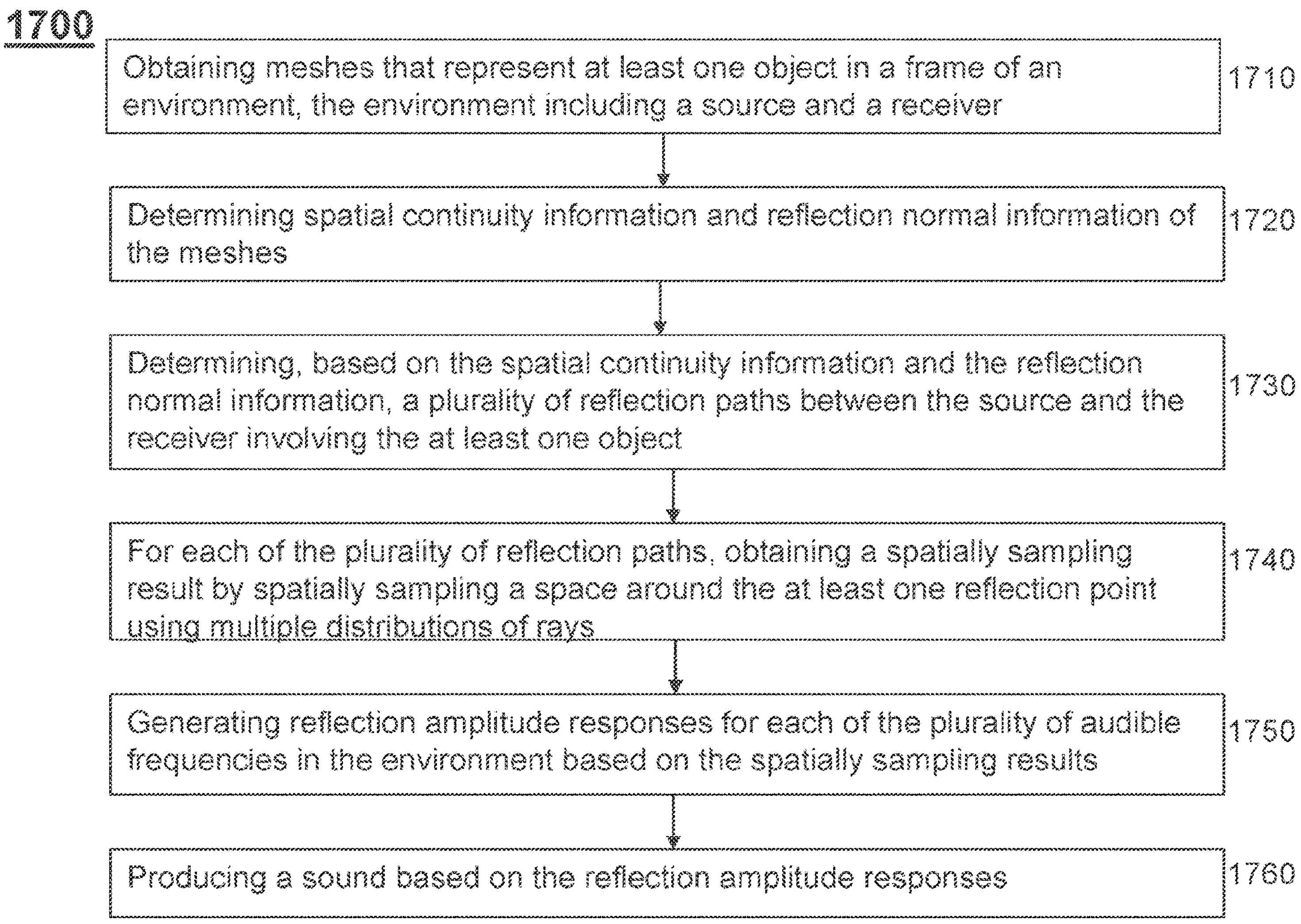
FIG. 17 shows a flowchart of a process for generating a sound according to some embodiments of the present document.

FIG. 17 shows a flowchart of a process for generating a sound according to some embodiments of the present document. A system including one or more processors and one or more storage devices, e.g., system 1500, device 1600, as illustrated in FIGS. 15 and 16, respectively, may perform one or more operations of the process 1700. For illustration and brevity, and not intended to be limiting, the following description of FIG. 17 refers to device 1600 that implement the process 1700.

At 1710, the process 1700 may include obtaining meshes that represent at least one object in a frame of an environment. The environment may include a source and a receiver, in addition to the at least one object. The at least one object may reflect sound. In some embodiments, the device 1600 may obtain the meshes from another device including, e.g., a game engine. In some embodiments, the device 1600 may generate the meshes. The device 1600 may obtain the frame of the environment, identify a representation of the at least one object in the frame; and generate the meshes by meshing the representation of the at least one object. The environment may be a real, physical one, or a virtual one. A frame of the environment may include an image or video frame of the environment acquired a time point. The frame may include a representation of the at least one object in the environment. In some embodiment, the environment may include multiple objects, and the frame may include representations of these objects. In some embodiments, the frame may include a representation of the source and/or the receiver.

Each of at least some of the meshes may have the shape of a triangle, a polygon, etc. A mesh may include multiple edges and multiple vertices. The meshes may include geometric information including, e.g., mesh vertices, indices, or material information of the at least one object.

Merely by way of example, the process 1700 may be applied to approximate sound propagation in an environment, e.g., a virtual scene in a video game. The environment may include multiple objects. An intersection of a ray with an object, or the reflection of a path from an object in the process may involve any object in the scene. If a path is a higher-order reflection path, meaning it has two or more reflections/bounces, those reflections in the higher-order reflection path may involve a same object or different objects. For example, a virtual scene may be an indoor room containing a desk (as well as one or more sources and one or more receivers), where the room itself is one object and the desk is another object. A second-order reflection path may begin at a receiver, reflect off one wall of the room, reflect off another wall of the room, and end at a source in the room. A different second-order reflection path may begin at a receiver, reflect off the ceiling of the room, reflect off the top of the desk, and end at the source.

At 1720, the process 1700 may include determining spatial continuity information and reflection normal information of the meshes. In some embodiments, the device 1600 may determine the spatial continuity information of the meshes by determining, for each edge of a mesh of the meshes, whether the edge is connected to another mesh of the meshes. The device 1600 may determine whether an edge shared by two meshes is on a smooth plane. In response to determining that the edge shared by the two meshes is on the smooth plane, the device 1600 may determine that the two meshes share vertexes of a shared edge as part of the spatial continuity information. In response to determining that the edge shared by the two meshes is not on any smooth plane, the device 1600 may assign duplicated vertices of the edge to the meshes, respectively. In some embodiments, the device 1600 may determine mesh continuity by, for each of the meshes, traversing a pattern around edges of the mesh, the pattern being co-planar with at least a portion of the mesh. See, e.g., FIG. 3 and the description thereof. More description of mesh continuity may be found elsewhere in the present document. See, e.g., section 2.1 of the present document.

In some embodiments, the device 1600 may determine reflection normal information of the meshes by determining, for each mesh of the meshes, a mesh reflection normal. Merely by way of example, the device 1600 may determine, for a mesh, vertex normals for each vertex of the edges of the mesh, and then determine edge normal for each edge of the mesh based on the vertex normal of the vertices of the edge, and determine the mesh normal (also referred to as a mesh reflection normal) based on the edge normals of the edges of the mesh. For an edge, the device 1600 may determine the edge normal based on vertex normals of vertexes on ends of the edge and a distance between each end of the edge and a reflection point on the mesh. For an edge of a mesh that is disconnected or concave, the device 1600 may determine that the edge normal is pointing outward from and tangent to the mesh. Based on edge normals of edges of a mesh, the device 1600 may determine the mesh reflection normal for the mesh by interpolation of the edge normals of the multiple edges of the mesh based on a distance between the reflection point on the mesh and each of the multiple edges. More description of mesh continuity may be found elsewhere in the present document. See, e.g., section 2.2 of the present document.

At 1730, the process 1700 may include determining, based on the spatial continuity information and the reflection normal information, a plurality of reflection paths between the source and the receiver involving the at least one object (e.g., one at the at least one object). A reflection path may have at least one reflection point associated with the at least one object (e.g., one of the at least one object).

The device 1600 may determine a sampling ray distribution according to an adaptive spatial sampling and originating from the receiver; and determine multiple path candidates by ray tracing based on rays that originate from the receiver according to the sampling ray distribution and intersect multiple representations of the source. The operation may also be referred to as ray tracing. The adaptive spatial sampling may be a substantially uniform spherical distribution centered at the receiver. The multiple representations of the source may include axis-aligned bounding boxes (AABBs). An AABB may correspond to a reflection order of a ray traveling from the receiver to the source. A lower reflection order may correspond to a smaller AABB. Based on the path candidates, the device 1600 may determine one or more reflection paths by performing one or more of path refinement, path merging, or path synchronization. More description of ray tracing may be found elsewhere in the present document. See, e.g., section 3.1 of the present document.

To perform path refinement, the device 1600 may perturb a ray from the receiver along two perpendicular directions; identify an intersection position of the perturbed ray with one of the multiple representations of the source; and determine whether the intersection position converges based on a distance between the intersection position with the source. The device 1600 may retain path candidates that are convergent and discard or modify the path candidates that are not convergent. More description of path refinement may be found elsewhere in the present document. See, e.g., section 3.2 of the present document.

To perform path merging, the device 1600 may identify nearby path candidates that connect the receiver and the source and are spaced from each other less than a threshold spacing distance; and determine the reflection path by merging the nearby path candidates. The device 1600 may employ a radius search algorithm to identify nearby path candidates. More description of path merging may be found elsewhere in the present document. See, e.g., sections 3.3 and 3.4 of the present document.

To perform path synchronization, the device 1600 may determine the reflection path by connecting, according to a radius search algorithm, a path candidate with a reflection path corresponding to a second frame of the environment that is different from and consecutive with respect to the frame. By performing path synchronization, the device 1600 may generate reflection paths that are stable and consistent across frames. More description of path synchronization may be found elsewhere in the present document. See, e.g., sections 3.3 and 3.5 of the present document.

At 1740, the process 1700 may include obtaining, for each of the plurality of reflection paths, a spatially sampled result by spatially sampling a space around the at least one reflection point using multiple distributions of rays. A distribution of rays is centered at a reflection point along a reflection path. In some embodiments, the multiple distributions may include concentric cylinders centered on a reflection point along a reflection path. One of such cylinders may have a dimension relating to one of a plurality of audible frequencies. The spatially sampled results may correlate with and delineate geometric information of the meshes. For example, the spatially sampled results may include information about those meshes' local size, shape, and the distance from any edges. More description of spatial sampling may be found elsewhere in the present document. See, e.g., section 4 of the present document. In some embodiments, the device 1600 may apply material-dependent filtering at each reflection point, with the materials defined at each vertex and interpolated between them according to the reflection point so as to take into consideration the impact of a material, in addition to the geometric information, of the at least one object on the reflection response of a sound signal.

At 1750, the process 1700 may include generating reflection amplitude responses for each of the plurality of audible frequencies in the environment based on the spatially sampled results. The device 1600 may provide the spatially sampled results obtained in 1750 to a machine learning engine to generate the reflection amplitude responses. The machine learning engine may include a deep neural network. In some embodiments, the spatially sampled results may include path lengths each along a spatial sampling ray organized in two dimensions including an angle and a linear dimension (indicating the radius of the cylinder where the spatial sampling ray is), the machine learning engine may correspondingly include a circular convolutional network structure. More description of DNN and the applications may be found elsewhere in the present document. See, e.g., section 5 and FIG. 10 of the present document.

At 1760, the process 1700 may include producing a sound based on the reflection amplitude responses. The sound may approximate what the receiver may receive when an output from the source propagates the environment.

Merely by way of example, the environment is an interactive virtual environment or an acoustical scene (e.g., in a video game, a virtual meeting), and the device 1600 is configured to generate a sound substantially real time. In some embodiments, the device 1600 may obtain meshes corresponding to multiple consecutive frames of the environment, in which at least one (sound reflecting) object in the environment represented in at least two of the multiple frames are different. For example, at least one object in the environment has moved between two frames, one object is added or removed from the environment between two frames, a source or a receive has changed its position in the environment between two frames, or the like, or a combination thereof. In at least some frames, the environment may include multiple objects that are sound reflecting. The device 1600 may generate multiple reflection amplitude responses for each of the plurality of audible frequencies in the environment based on the machine learning engine and multiple spatially sampled results corresponding to the multiple frames; and produce, based on the multiple reflection amplitude responses, a simulated sound over time that corresponds to the multiple frames.

At least a portion of the process 1700 may be implemented on one or more GPUs. At least a portion of the process 1700 may be implemented in parallel. Some operations of the process 1700 may be omitted. For example, 1760 may be omitted.

EXAMPLES

Some example technical solutions are implemented as described below.

1. A method for generating a sound, including: obtaining meshes that represent at least one object in a frame of an environment, the environment including a source and a receiver; determining spatial continuity information and reflection normal information of the meshes; determining, based on the spatial continuity information and the reflection normal information, a plurality of reflection paths between the source and the receiver involving the at least one object, each of the plurality of reflection paths having at least one reflection point associated with the at least one object; for each of the plurality of reflection paths, obtaining a spatially sampled result by spatially sampling a space around the at least one reflection point using multiple distributions of rays, wherein each of the multiple distributions of rays is centered at the at least one reflection point and has a dimension relating to one of a plurality of audible frequencies, the spatially sampled results correlating with geometric information of the meshes; generating reflection amplitude responses for each of the plurality of audible frequencies in the environment based on the spatially sampled results; and producing, based on the reflection amplitude responses, a sound to be received by the receiver from the source after propagation in the environment.

2. A method for determining reflection amplitude responses for acoustical waves in an acoustical scene, including: obtaining meshes that represent at least one object in a frame of the acoustical scene, the acoustical scene including a source and a receiver; determining spatial continuity information and reflection normal information of the meshes; determining, based on the spatial continuity information and the reflection normal information, a plurality of reflection paths between the source and the receiver involving the at least one object, each of the plurality of reflection paths having at least one reflection point associated with the at least one object; for each of the plurality of reflection paths, obtaining a spatially sampled result by spatially sampling a space around the at least one reflection point using multiple distributions of rays, wherein each of the multiple distributions of rays is centered at the at least one reflection point and has a dimension relating to one of a plurality of audible frequencies, the spatially sampled results correlating with geometric information of the meshes; and generating reflection amplitude responses for each of the plurality of audible frequencies in the acoustical scene based on the spatially sampled results.

3. The method of any one or more of the solutions herein, wherein generating the reflection amplitude responses includes inputting the spatially sampled results into a machine learning engine.

4. The method of any one or more of the solutions herein, in which the machine learning engine includes a deep neural network.

5. The method of any one or more of the solutions herein, in which each of the meshes has multiple edges, and determining the spatial continuity information of the meshes includes determining, for each edge of a mesh of the meshes, whether the edge is connected to another mesh of the meshes.

6. The method of any one or more of the solutions herein, wherein determining, for each edge of a mesh of the meshes, whether the edge is connected to another mesh of the meshes includes: determining whether an edge shared by two meshes is on a smooth plane; and in response to determining that the edge shared by the two meshes is on the smooth plane, determining that the two meshes share vertexes of a shared edge as part of the spatial continuity information.

7. The method of any one or more of the solutions herein, in which determining, for each edge of a mesh of the meshes, whether the edge is connected to another mesh of the meshes includes: determining whether an edge shared by two meshes is on any smooth plane; and in response to determining that the edge shared by the two meshes is not on any smooth plane, assigning duplicated vertices of the edge to the meshes, respectively.

8. The method of any one or more of the solutions herein, in which determining the spatial continuity information of the meshes includes determining mesh continuity by, for each of the meshes, traversing a pattern around edges of the mesh, the pattern including rays of different directions.

9. The method of any one or more of the solutions herein, in which determining the reflection normal information of the meshes includes determining the reflection normal information of the meshes by determining, for each mesh of the meshes, a mesh reflection normal.

10. The method of any one or more of the solutions herein, in which: each of the meshes has multiple vertexes and multiple edges, and determining a mesh reflection normal for each mesh of the meshes includes: for each of the multiple edges of the mesh, determining a vertex normal of each of the multiple vertexes of the edge; and determining an edge normal based on vertex normals of vertexes on ends of the edge and a distance between each end of the edge and a reflection point on the mesh; and determining the mesh reflection normal for the mesh by interpolation of the edge normals of the multiple edges of the mesh based on a distance between the reflection point and each of the multiple edges.

11. The method of any one or more of the solutions herein, in which determining the mesh reflection normal for each mesh of the meshes includes: determining whether an edge of a mesh is disconnected or concave; and in response to determining that the edge of the mesh is disconnected or concave, determining that the edge normal is pointing outward from and tangent to the mesh.

12. The method of any one or more of the solutions herein, in which determining the reflection path includes: determining a sampling ray distribution according to an adaptive spatial sampling and originating from the receiver; and determining multiple path candidates by ray tracing based on rays that originate from the receiver according to the sampling ray distribution and intersect multiple representations of the source.

13. The method of any one or more of the solutions herein, in which the adaptive spatial sampling includes a substantially uniform spherical distribution centered at the receiver.

14. The method of any one or more of the solutions herein, in which the multiple representations of the source includes axis-aligned bounding boxes, each of which corresponds to a reflection order of a ray traveling from the receiver to the source.

15. The method of any one or more of the solutions herein, further including determining the reflection path, from the multiple path candidates, by performing at least one of path refinement, path merging, or path synchronization.

16. The method of any one or more of the solutions herein, in which the path refinement includes: perturbing a ray from the receiver along two perpendicular directions; identifying an intersection position of the perturbed ray with one of the multiple representations of the source; and determining whether the intersection position converges based on a distance between the intersection position with the source.

17. The method of any one or more of the solutions herein, in which the path merging includes: identifying, according to a radius search algorithm, nearby path candidates that connect the receiver and the source and are spaced from each other less than a threshold spacing distance; and determining the reflection path by merging the nearby path candidates.

18. The method of any one or more of the solutions herein, in which the path synchronization includes: determining the reflection path by connecting, according to a radius search algorithm, a path candidate with a reflection path corresponding to a second frame of the environment that is different from the frame.

19. The method of any one or more of the solutions herein, in which each of at least one of the multiple distributions of rays forms a shape of cylinder.

20. The method of any one or more of the solutions herein, in which at least some of the multiple distributions of rays form concentric cylinders.

21. The method of any one or more of the solutions herein, in which: each of at least one of the spatially sampled results includes a path length along a spatial sampled ray organized using two-dimensional coordinates including an angle and a linear dimension indicating the path length along the spatial sampling ray, and the machine learning engine includes a circular convolutional network structure.

22. The method of any one or more of the solutions herein, in which the environment has multiple objects represented by the meshes.

23. The method of any one or more of the solutions herein, further including: obtaining meshes corresponding to multiple consecutive frames of the environment, in which the at least one object in the environment represented in at least two of the multiple frames are different; generating multiple reflection amplitude responses for each of the plurality of audible frequencies in the environment using the machine learning engine and multiple spatially sampled results corresponding to the multiple frames; and producing the sound based on the multiple reflection amplitude responses.

24. The method of any one or more of the solutions herein, in which obtaining the meshes or producing the sound based on the multiple reflection amplitude responses is performed in an interactive application.

25. The method of any one or more of the solutions herein, in which the environment is an interactive virtual environment.

26. The method of any one or more of the solutions herein, wherein at least a portion of the method is performed on a GPU.

27. The method of any one or more of the solutions herein, in which generating the reflection amplitude responses includes applying a material filter.

28. The method of any one or more of the solutions herein, in which the geometric information of the meshes includes mesh vertices, indices, or material information of the at least one object.

29. The method of any one or more of the solutions herein, in which obtaining the meshes includes: obtaining the frame of the environment; identifying a representation of the at least one object in the frame; and generating the meshes by meshing the representation of the at least one object.

30. The method of any one or more of the solutions herein, in which obtaining the meshes including: retrieving the meshes from another source (e.g., a game engine).

31. The method of any one or more of the solutions herein, in which each of at least some of the meshes has a shape of a triangle.

32. The method of any one or more of the solutions herein, in which the frame is a video frame of a series of video frames relating to the environment.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term “data processing unit” or “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

The term “about,” as used herein when referring to a measurable value such as an amount or concentration and the like, is meant to encompass variations of 20%, 10%, 5%, 1%, 0.5%, or even 0.1% of the specified amount.

It is intended that the specification, together with the drawings, be considered exemplary only, where exemplary means an example. As used herein, the singular forms “a”, “an” and “the” are intended to include the plural forms as well, unless the context clearly indicates otherwise. Additionally, the use of “or” is intended to include “and/or”, unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A computer implemented method for generating a sound, comprising:

using a processor coupled to a memory with instructions stored thereon for:

obtaining meshes that represent at least one object in a frame of an environment, the environment including a source and a receiver;

determining spatial continuity information and reflection normal information of the meshes;

determining, based on the spatial continuity information and the reflection normal information, a plurality of reflection paths between the source and the receiver involving the at least one object, each of the plurality of reflection paths having at least one reflection point associated with the at least one object;

for each of the plurality of reflection paths, obtaining a spatially sampled result by spatially sampling a space around the at least one reflection point using multiple distributions of rays, wherein each of the multiple distributions of rays is centered at the at least one reflection point and has a dimension relating to one of a plurality of audible frequencies, the spatially sampled results correlating with geometric information of the meshes;

generating reflection amplitude responses for each of the plurality of audible frequencies in the environment based on the spatially sampled results; and producing, based on the reflection amplitude responses, a sound to be received by the receiver from the source after propagation in the environment.

2. The method of claim 1, wherein generating the reflection amplitude responses comprises providing the spatially sampled results to a machine learning engine.

3. The method of claim 2, wherein the machine learning engine comprises a deep neural network.

4. The method of claim 1, wherein:

each of the meshes has multiple edges, and determining the spatial continuity information of the meshes comprises determining, for each edge of a mesh of the meshes, whether the edge is connected to another mesh of the meshes.

5. The method of claim 1, wherein determining the spatial continuity information of the meshes comprises determining mesh continuity by, for each of the meshes, traversing a pattern around edges of the mesh, the pattern including rays having respective directions.

6. The method of claim 1, wherein determining the reflection normal information of the meshes comprises determining, for each mesh of the meshes, a mesh reflection normal.

7. The method of claim 6, wherein:

each of the meshes has multiple vertexes and multiple edges, and determining a mesh reflection normal for each mesh of the meshes comprises:

for each of the multiple edges of the mesh, determining a vertex normal of each of the multiple vertexes of the edge; and determining an edge normal based on vertex normal of vertexes on ends of the edge and a distance between each end of the edge and a reflection point on the mesh; and determining the mesh reflection normal for the mesh by interpolation of the edge normal of the multiple edges of the mesh based on a distance between the reflection point and each of the multiple edges.

8. The method of claim 1, wherein determining the plurality of reflection paths comprises:

determining a sampling ray distribution according to an adaptive spatial sampling and originating from the receiver; and determining multiple path candidates by ray tracing based on rays that originate from the receiver according to the sampling ray distribution and intersect multiple representations of the source.

9. The method of claim 8, wherein the adaptive spatial sampling comprises a substantially uniform spherical distribution centered at the receiver.

10. The method of claim 8, wherein the multiple representations of the source comprises axis-aligned bounding boxes, each of which corresponds to a reflection order of a ray traveling from the receiver to the source.

11. The method of claim 8, further comprising determining the plurality of reflection paths, from the multiple path candidates, by performing at least one of path refinement, path merging, or path synchronization.

12. The method of claim 1, wherein each of at least one of the multiple distributions of rays forms a shape of cylinder.

13. The method of claim 1, wherein the at least one object in the environment includes multiple objects represented by the meshes.

14. The method of claim 1, further comprising:

obtaining meshes corresponding to multiple consecutive frames of the environment, wherein the at least one object in the environment represented in at least two of the multiple consecutive frames are different;

generating multiple reflection amplitude responses for each of the plurality of audible frequencies in the environment using a machine learning engine and multiple spatially sampled results corresponding to the multiple consecutive frames; and producing the sound based on the multiple reflection amplitude responses.

15. The method of claim 14, wherein obtaining the meshes or producing the sound based on the multiple reflection amplitude responses is performed in an interactive application.

16. The method of claim 1, wherein the environment is an interactive virtual environment.

17. The method of claim 1, wherein at least a portion of the method is performed on a GPU.

18. The method of claim 1, wherein generating the reflection amplitude responses comprises applying a material filter.

19. A computer implemented method for determining reflection amplitude responses for acoustical waves in an acoustical scene, comprising:

using a processor coupled to a memory with instructions stored thereon to:

obtain meshes that represent at least one object in a frame of the acoustical scene, the acoustical scene including a source and a receiver;

determine spatial continuity information and reflection normal information of the meshes;

determining determine, based on the spatial continuity information and the reflection normal information, a plurality of reflection paths between the source and the receiver involving the at least one object, each of the plurality of reflection paths having at least one reflection point associated with the at least one object;

for each of the plurality of reflection paths, obtain a spatially sampled result by spatially sampling a space around the at least one reflection point using multiple distributions of rays, wherein each of the multiple distributions of rays is centered at the at least one reflection point and has a dimension relating to one of a plurality of audible frequencies, the spatially sampled results correlating with geometric information of the meshes; and generate reflection amplitude responses for each of a plurality of audible frequencies in the acoustical scene based on the spatially sampled results.

20. A system for producing a sound, the system comprising:

memory storing computer program instructions; and one or more processors configured to execute the computer program instructions to effectuate operations of a method comprising:

obtaining meshes that represent at least one object in a frame of an environment, the environment including a source and a receiver;

determining spatial continuity information and reflection normal information of the meshes;

determining, based on the spatial continuity information and the reflection normal information, a plurality of reflection paths between the source and the receiver involving the at least one object, each of the plurality of reflection paths having at least one reflection point associated with the at least one object;

for each of the plurality of reflection paths, obtaining a spatially sampled result by spatially sampling a space around the at least one reflection point using multiple distributions of rays, wherein each of the multiple distributions of rays is centered at the at least one reflection point and has a dimension relating to one of a plurality of audible frequencies, the spatially sampled results correlating with geometric information of the meshes;

generating reflection amplitude responses for each of the plurality of audible frequencies in the environment based on the spatially sampled results; and producing, based on the reflection amplitude responses, a sound to be received by the receiver from the source after propagation in the environment.

* * * * *